US012717875B2

(12) United States Patent
Bahrami et al.

(10) Patent No.: US 12,717,875 B2
(45) Date of Patent: Aug. 25, 2026

(54) AUTOMATED EXPLORATORY DATA ANALYSIS (EDA)

(71) Applicant: Fujitsu Limited, Kawasaki (JP)

(72) Inventors: Mehdi Bahrami, San Jose, CA (US); Wei-Peng Chen, Fremont, CA (US); Mukul Prasad, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 855 days.

(21) Appl. No.: 18/173,106

(22) Filed: Feb. 23, 2023

(65) Prior Publication Data

US 2024/0289420 A1 Aug. 29, 2024

(51) Int. Cl.
*G06F 17/18* (2006.01)
*G06F 40/20* (2020.01)

(52) U.S. Cl.
CPC .............. *G06F 17/18* (2013.01); *G06F 40/20* (2020.01)

(58) Field of Classification Search
CPC ........... G06F 17/18; G06F 40/20; G06F 40/30
See application file for complete search history.

(56) References Cited

U.S. PATENT DOCUMENTS 11,562,019 B2 * 1/2023 Xu ...................... G06F 16/2474
12,204,532 B2 * 1/2025 Patel ................. G06F 16/24522
2015/0356085 A1 12/2015 Panda et al.
2017/0228368 A1 * 8/2017 Carter .................... G06N 5/022
2018/0088753 A1 * 3/2018 Viégas .................... G06F 40/18
2018/0267960 A1 * 9/2018 Rajendran .............. G06F 40/30
2019/0179648 A1 6/2019 Kevorkian
2022/0244815 A1 * 8/2022 Harris ..................... G06F 17/15
2024/0095447 A1 * 3/2024 Ping ........................ G10L 13/02
2024/0338554 A1 * 10/2024 Schmidt ................. G06N 3/045
2025/0110934 A1 * 4/2025 Dibia ...................... G10L 15/16
(Continued)

OTHER PUBLICATIONS

Becher Jonathan D., Pavel Berkhin, and Edmund Freeman. "Automating exploratory data analysis for efficient data mining." In Proceedings of the Sixth ACM SIGKDD International Conference on Knowledge Discovery and Data Mining, pp. 424-429. 2000.
(Continued)

*Primary Examiner* — Barbara M Level
(74) *Attorney, Agent, or Firm* — Fujitsu Intellectual Property Center

(57) ABSTRACT

In an embodiment, a statistical analysis tool is applied on a first set of datapoints related to a first variable associated with a dataset. Based on the application of the statistical analysis tool, statistical information related to the first variable is determined. A set of patterns associated with the first set of datapoints is determined, based on the determined statistical information. Thereafter, a first set of predefined templates associated with the determined set of patterns is determined. Further, a natural language model is applied on the retrieved first set of predefined templates and on the determined statistical information. A first textual explanation of the determined set of patterns is determined, based on the application of the natural language model on the retrieved first set of predefined templates and on the determined statistical information. Further, the determined first textual explanation is rendered on a display device.

20 Claims, 17 Drawing Sheets

(56) References Cited

U.S. PATENT DOCUMENTS

2025/0124059 A1* 4/2025 Chajewska ............ G06F 40/30

OTHER PUBLICATIONS

Milo Tova, and Amit Somech. "Automating exploratory data analysis via machine learning: An overview." In Proceedings of the 2020 ACM SIGMOD International Conference on Management of Data, pp. 2617-2622. 2020.

Extended European Search Report dated Jun. 25, 2024 for corresponding European Patent Application No. 24157836.8, 8 pages.

* cited by examiner

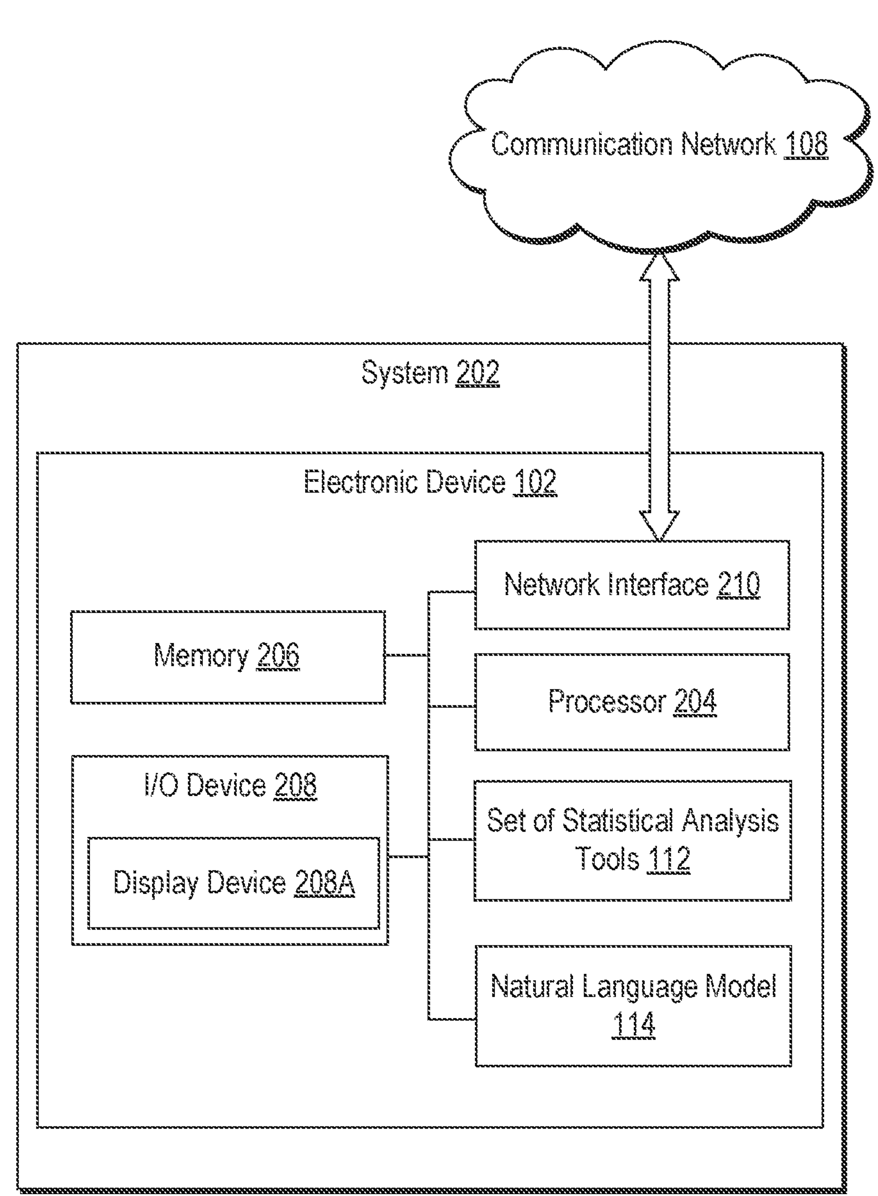
FIG. 2

Apply transformation function on first set of datapoints 1002

Transform first set of datapoints to obtain updated dataset, based on application of transformation function on first set of datapoints, where determination of set of patterns associated with first set of datapoints is further based on transformation of first set of datapoints 1004

*FIG. 10*

Determine skewness associated with first set of datapoints 1102

Compare determined skewness with set of predefined thresholds, where determination of set of patterns associated with first set of datapoints is further based on comparison of determined skewness with set of predefined thresholds 1104

*FIG. 11*

Determine kurtosis associated with first set of datapoints 1202

Determine whether determined kurtosis corresponds to abnormal value, where determination of set of patterns associated with first set of datapoints is further based on determined kurtosis and on determination that determined kurtosis corresponds to abnormal value 1204

*FIG. 12*

1300

Determine whether datatype of selected first variable corresponds to object type, wherein datatype of selected first variable corresponds to one of string datatype, integer datatype, floating-point datatype, mixed datatype of string and integer, mixed datatype of string and floating-point, or mixed datatype of integer and floating-point 1302

Determine whether datatype corresponds to string datatype or numeric datatype, based on determination that datatype corresponds to object type 1304

Determine whether datatype corresponds to Boolean string datatype, based on determination that datatype corresponds to string datatype 1306

Map first set of datapoints from Boolean string datatype to numeric datatype 1308

Determine whether datatype corresponds to floating-point numeric datatype or integer numeric datatype, based on determination that datatype corresponds to numeric datatype or based on mapping 1310

Convert datatype to floating-point numeric datatype to obtain updated dataset, based on determination that datatype corresponds to floating-point numeric datatype or integer numeric datatype 1312

Convert datatype to integer numeric datatype to obtain updated dataset, based on determination that datatype does not correspond to floating-point numeric datatype or integer numeric datatype, where determination of set of patterns associated with first set of datapoints is further based on obtained updated dataset 1314

*FIG. 13*

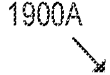

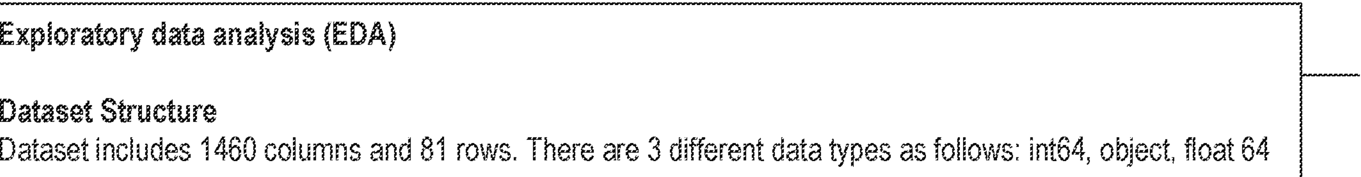

Exploratory data analysis (EDA)

Dataset Structure
Dataset includes 1460 columns and 81 rows. There are 3 different data types as follows: int64, object, float 64

Finding Interesting Datapoints
Let's process each field by their histogram frequency and check if there is any interesting point. There are 54 number of interesting values in the following columns.

|  | Field | Value | Bound | Lower | Upper | Total |
|---|---|---|---|---|---|---|
| 0 | MSSubClass | 20 | Upper | 4.0084 | 535.6682 | 536 |
| 1 | MSZoning | RL | Upper | 10.0024 | 1150.6268 | 1151 |
| 2 | LotFrontPage | 60 | Upper | 0.0110 | 142.1970 | 143 |
| 3 | LotArea | 7200 | Upper | 1.0000 | 24.8928 | 25 |
| 4 | LandContour | Lvl | Upper | 36.0042 | 1310.6256 | 1311 |
| 5 | LotConfig | Inside | Upper | 4.0172 | 1051.6844 | 1052 |
| 6 | Neighbourhood | Names | Upper | 2.0168 | 224.8200 | 225 |
| 7 | Condition1 | Norm | Upper | 2.0024 | 1259.0568 | 1260 |
| 8 | Condition2 | Norm | Upper | 1.0000 | 1443.9927 | 1445 |
| 9 | BldgType | 1Fam | Upper | 31.0048 | 1219.0568 | 1220 |
| 10 | HouseStyle | 1Story | Upper | 8.0021 | 725.8033 | 726 |
| 11 | OverallCond | 5 | Upper | 1.0032 | 820.5448 | 821 |
| 12 | YearBuilt | 2006 | Upper | 1.0000 | 66.9667 | 67 |
| 13 | YearRemodAdd | 1950 | Upper | 4.0060 | 177.5140 | 178 |
| 14 | RoofStyle | Gable | Upper | 2.0025 | 1140.5725 | 1141 |
| 15 | RoofMatl | CompShg | Upper | 1.0000 | 1433.0039 | 1434 |

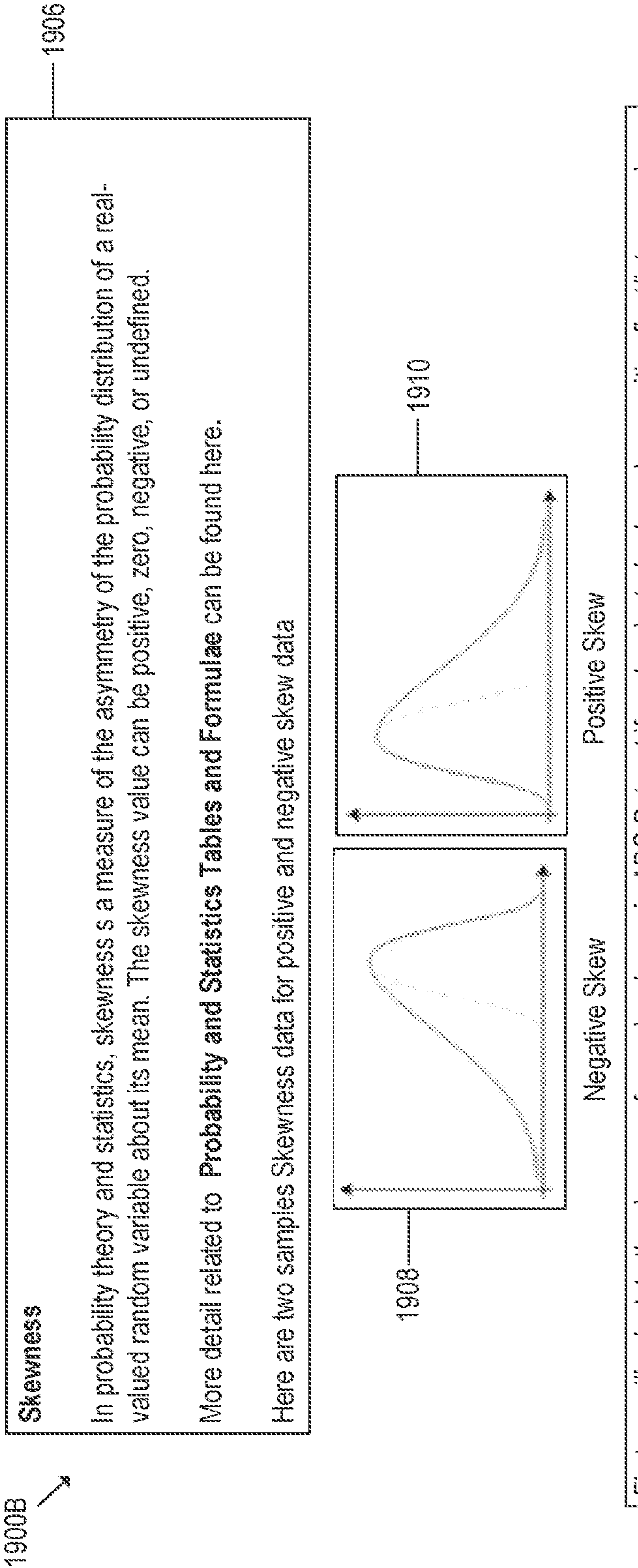

1912

First we will calculate the skewness for each columns in ABC Dataset if each selected column has positive float/integer values.
Second we will review the following conditions.

- If Skewness > 1 or Skewness < -1, we will consider it as highly skewed;
- If 0.5 < Skewness <= 1 or -0.5 < Skewness <= -1, we will consider it as moderate skewed.

1914

| | Column | Skewness | Skewness_Type |
|---|---|---|---|
| 0 | Pclass | -0.630548 | Moderately Skewed |
| 1 | SibSp | 3.695352 | Highly Skewed |
| 2 | Parch | 2.749117 | Highly Skewed |
| 3 | Fare | 4.787317 | Highly Skewed |

*FIG. 19B*

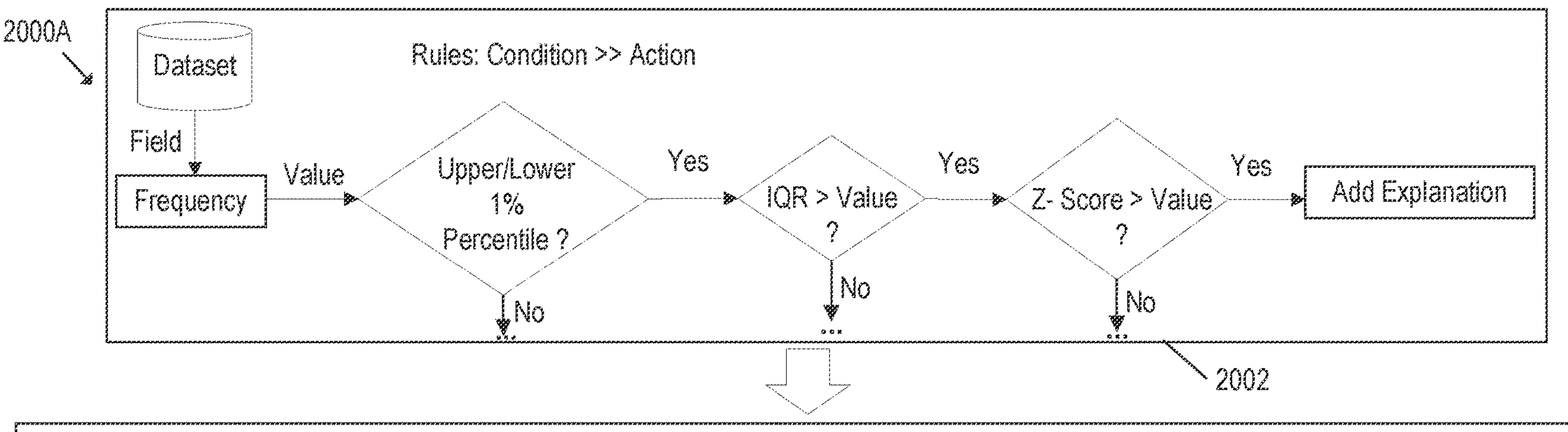

Finding Interesting Datapoints
Let's process each field by their histogram frequency and check if there is any interesting data point.

There are 4 number of interesting values in the following columns. The below table shows each Value of each Field (Column) with their total frequencies, Lower shows the lower frequency of normal distribution, and Criteria shows if the frequency passed Upper Bound or Lower Bound

2004

| | Field | Value | Frequency | Lower | Upper | Criteria |
|---|---|---|---|---|---|---|
| 0 | Age | 24.00 | 30 | 0.0088 | 29.9736 | Upper |
| 1 | SibSp | 0.00 | 608 | 5.0012 | 607.7606 | Upper |
| 2 | Parch | 0.00 | 678 | 1.0018 | 677.6640 | Upper |
| 3 | Fare | 8.05 | 43 | 1.0000 | 42.9753 | Upper |

2006

2008

For example, in the Age column the value of 24.0 has 30 repetition but this number is not between Lower Bound (0.0088) and Upper Bound (29.97360000000002).

Let C-0 = 24.0, and Freq (C-0) = 30, Upper (C-0) = 29.97360000000002, Lower (C-0) = 0.0088

Freq (C-0) > Upper (C-0)

*FIG. 20A*

AUTOMATED EXPLORATORY DATA ANALYSIS (EDA)

FIELD

The embodiments discussed in the present disclosure are related to automated exploratory data analysis (EDA).

BACKGROUND

Advancements in the field of data analytics have led to the development of various machine learning models. A machine learning model may be trained on a dataset to classify unseen data in predefined classes or make predictions for a certain variable, from the unseen data. However, prior to the training of the machine learning model on the dataset, typically, the dataset may be required to be pre-processed, structured, and analyzed. The pre-processing of the dataset may include data cleansing, while the structuring of the dataset may include data organization and data normalization. The analysis of the dataset may include a determination of trends from the pre-processed and structured dataset. Based on the determination of the trends, feature engineering may be performed on the dataset to select features from the dataset for the training of the machine learning model on the dataset. Typically, the analysis of the dataset for the determination of trends may require multiple user inputs from an expert user, such as, a data scientist, a domain expert, or a data engineer. To determine the trends, the expert user may need to manually inspect the dataset heuristically, by use of one or more analysis tools. Such manual inspection of the dataset may be a non-trivial and time-consuming task, which may require a significant effort from the expert user, especially in case of real-world datasets, which may be large and may have a high complexity due to a several features.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include a set of operations may include receiving a dataset including datapoints related to a set of variables. The set of operations may further include selecting a statistical analysis algorithm from a set of statistical analysis tools to analyze the received dataset. The set of operations may further include selecting a first variable of the set of variables. The set of operations may further include applying the selected statistical analysis tool on a first set of datapoints related to the selected first variable. The set of operations may further include determining statistical information related to the selected first variable, based on the application of the selected statistical analysis tool on the first set of datapoints. The set of operations may further include determining a set of patterns associated with the first set of datapoints, based on the determined statistical information related to the selected first variable. The set of operations may further include retrieving a first set of predefined templates associated with the determined set of patterns. The set of operations may further include applying a natural language model on the retrieved first set of predefined templates and on the determined statistical information. The set of operations may further include determining a first textual explanation of the determined set of patterns, based on the application of the natural language model on the retrieved first set of predefined templates and on the determined statistical information. The set of operations may further include controlling a display device to render the determined first textual explanation.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2 is a block diagram that illustrates an exemplary electronic device for an automated exploratory data analysis (EDA);

FIG. 10 is a diagram that illustrates a flowchart of an example method for application of a transformation function on a variable of a dataset and generation of associated textual explanation;

FIG. 11 is a diagram that illustrates a flowchart of an example method for determination of skewness of datapoints of a variable and generation of associated textual explanation;

FIG. 12 is a diagram that illustrates a flowchart of an example method for determination of kurtosis of datapoints of a variable and generation of associated textual explanation;

FIG. 13 is a diagram that illustrates a flowchart of an example method for automated datatype consistency check and automated dataset revision for inconsistent data;

FIG. 19A is a diagram that illustrates an exemplary scenario for display of a textual explanation associated a set of patterns determined for a variable;

FIG. 19B is a diagram that illustrates an exemplary scenario for display of summary results including a graphical representation and a textual explanation, associated with a set of patterns determined from a dataset;

FIG. 20A is a diagram that illustrates an exemplary scenario for determination of a set of patterns from a dataset and display of a textual explanation of the determined set of patterns.

Figure 1:
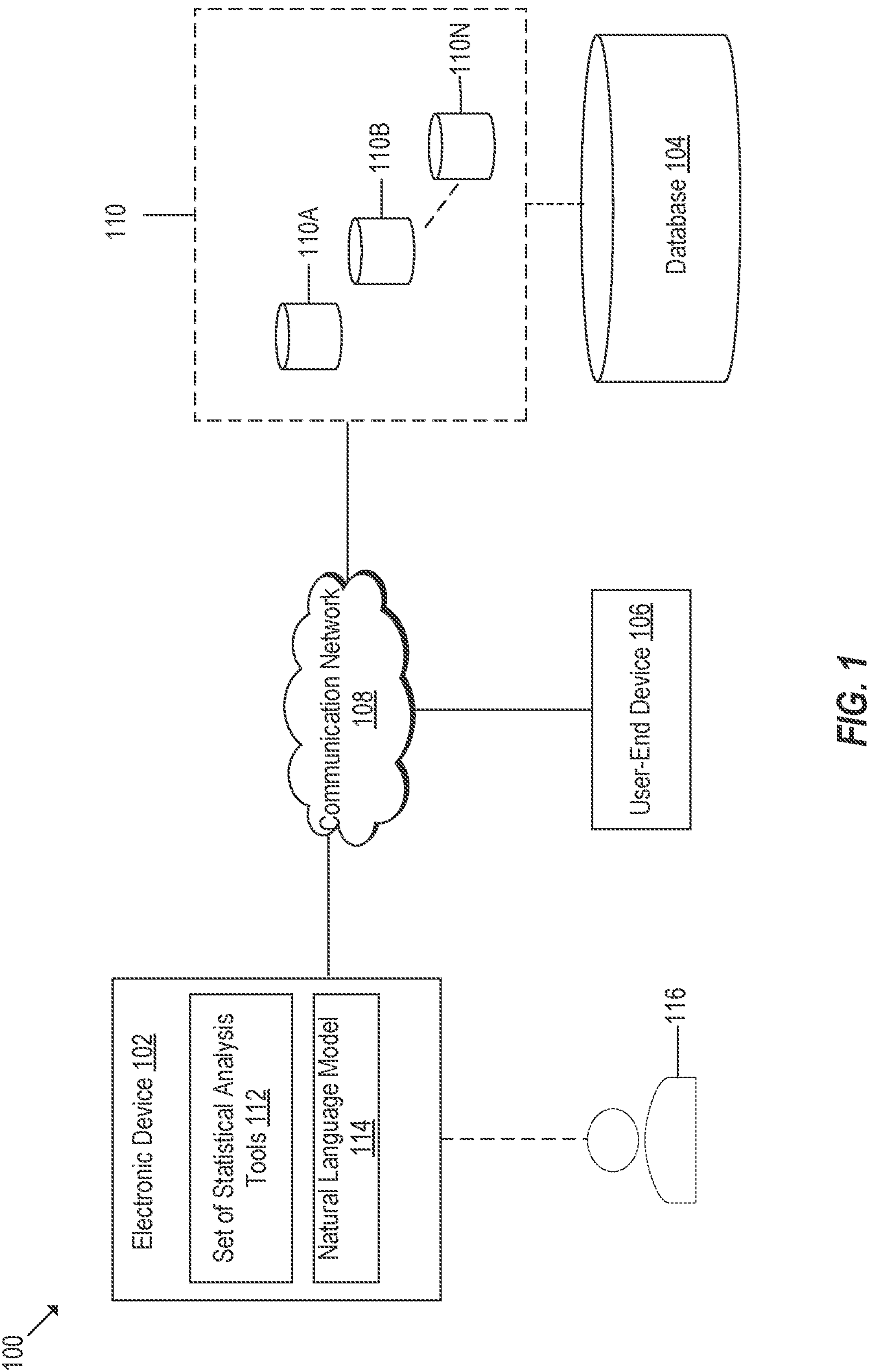
FIG. 1 is a diagram representing an example environment related to an automated exploratory data analysis (EDA)

all according to at least one embodiment described in the present disclosure.

DESCRIPTION OF EMBODIMENTS

Some embodiments described in the present disclosure relate to methods and systems for automated exploratory data analysis (EDA). In the present disclosure, a dataset including datapoints related to a set of variables may be received. A statistical analysis tool may be selected from a set of statistical analysis tools to analyze the received dataset. Further, a first variable may be selected from the set of variables. Thereafter, the selected statistical analysis tool may be applied on a first set of datapoints related to the selected first variable. Further, statistical information related to the selected first variable may be determined, based on the application of the selected statistical analysis tool on the first set of datapoints. Thereafter, a set of patterns associated with the first set of datapoints may be determined, based on the determined statistical information related to the selected first variable. A first set of predefined templates associated with the determined set of patterns may be retrieved. Further, a natural language model may be applied on the retrieved first set of predefined templates and on the determined statistical information. Thereafter, a first textual explanation of the determined set of patterns may be determined, based on the application of the natural language model on the retrieved first set of predefined templates and on the determined statistical information. A display device may be controlled to render the determined first textual explanation.

According to one or more embodiments of the present disclosure, the technological field of data analytics may be improved by configuring a computing system (e.g., an electronic device) in a manner that the computing system may be able to execute automated exploratory data analysis (EDA) on a dataset. The computing system may receive dataset including datapoints related to a set of variables may be received. The computing system may select a statistical analysis algorithm from a set of statistical analysis tools to analyze the received dataset. Further, the computing system may select a first variable from the set of variables. Thereafter, the computing system may apply selected statistical analysis tool on a first set of datapoints related to the selected first variable. Further, the computing system may determine statistical information related to the selected first variable, based on the application of the selected statistical analysis tool on the first set of datapoints. Thereafter, the computing system may determine a set of patterns associated with the first set of datapoints, based on the determined statistical information related to the selected first variable. The computing system may retrieve a first set of predefined templates associated with the determined set of patterns. Further, the computing system may apply a natural language model on the retrieved first set of predefined templates and on the determined statistical information. Thereafter, the computing system may determine a first textual explanation of the determined set of patterns, based on the application of the natural language model on the retrieved first set of predefined templates and on the determined statistical information. Further, the computing system may control a display device to render the determined first textual explanation.

Typically, prior to use of a dataset in a machine learning (ML) pipeline, the dataset may be required to be analyzed to determine trends from the dataset and to perform feature engineering on the dataset, based on the determined trends. Based on feature engineering, an ML model associated with the ML pipeline may be trained and fine-tuned on the dataset. The accuracy of the trained and fine-tuned ML model may depend on how well feature engineering has been performed on the dataset, and the quality of the feature engineering may be based on the data trend determination. Typically, the analysis of the dataset for data trend determination may require multiple user inputs from an expert user, such as, a data scientist, a domain expert, or a data engineer. To determine the trends, the expert user may need to manually inspect the dataset heuristically, by use of one or more analysis tools. Such manual inspection of the dataset may be a non-trivial and time-consuming task, which may require a significant effort from the expert user, especially in case of real-world datasets, which may be large in size and may have a high complexity due to a large number of features.

The disclosed electronic device (i.e., the computing system), on the other hand, may automatically determine statistical information associated with a variable related to datapoints in a dataset. Further, the disclosed electronic device may determine a set of patterns associated with the datapoints related to the variable, based on the determined statistical information. A set of predefined templates related to the determined set of patterns may be retrieved and a natural language model may be applied on the retrieved set of patterns and on the determined statistical information. A textual explanation of the determined set of patterns may be determined based on the application of the natural language model. The textual explanation may be presented to a user, such as, the expert user (e.g., a data scientist). The textual explanation of the set of patterns, which may be determined from the dataset, may include easy-to-understand natural language insights into various data trends. The manual task of data trend inspection, which may be consume a lot of time and effort of the expert user, may thereby be automated and simplified for the expert user.

Embodiments of the present disclosure are explained with reference to the accompanying drawings.

FIG. 1 is a diagram representing an example environment related to an automated exploratory data analysis (EDA), according to at least one embodiment described in the present disclosure. With reference to FIG. 1, there is shown an environment 100. The environment 100 may include an electronic device 102, a database 104, a user-end device 106, and a communication network 108. The database 104 may include one or more datasets, such as, a dataset 110A, a dataset 110B, . . . and a dataset 110C. Each dataset of the one or more datasets may include datapoints related to a set of variables. The electronic device 102 may include a set of statistical analysis tools 112 and a natural language model 114. In FIG. 1, there is further shown a user 116 who may be associated with the electronic device 102 and/or may operate the electronic device 102. The one or more datasets shown in FIG. 1 is presented merely as an example and may include only one or more than "N" datasets, without departure from the scope of the disclosure.

The electronic device 102 may include suitable logic, circuitry, and interfaces that may be configured to execute automated exploratory data analysis (EDA) on a dataset, such as, the dataset 110A. The electronic device 102 may automatically determine statistical information associated with a variable related to datapoints in the dataset 110A. The statistical information may be determined based on an application of the set of statistical analysis tools 112 on the datapoints related to the variable in the dataset 110A. Further, the electronic device 102 may be configured determine a set of patterns associated with the datapoints related to the variable, based on the determined statistical information. The electronic device 102 may be configured to retrieve a set of predefined templates related to the determined set of patterns. Further, the electronic device 102 may be configured to apply a natural language model (e.g., the natural language model 114) on the retrieved set of patterns and on the determined statistical information. The electronic device 102 may be configured to determine a textual explanation of the determined set of patterns, based on the application of the natural language model 114. The determined textual explanation may be displayed to the user 116, on a display device (e.g., a display device 206A of FIG. 2) of the electronic device 102. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The database 104 may include suitable logic, interfaces, and/or code that may be configured to store the one or more datasets, such as, the dataset 110A, the dataset 110B, . . . and the dataset 110C. In certain scenarios, the database 104 may also store the set of statistical analysis tools 112 and/or the natural language model 114. The database 104 may be derived from data off a relational or non-relational database, or a set of comma-separated values (csv) files in conventional or big-data storage. The database 104 may be stored or cached on a device, such as a server or the electronic device 102. The device storing the database 104 may be configured to receive a query for a dataset, such as, the dataset 110A. In response, the device of the database 104 may be configured to retrieve and provide the queried dataset. In some embodiments, the database 104 may be hosted on a plurality of servers stored at same or different locations. The operations of the database 104 may be executed using hardware including a processor, a microprocessor (e.g., to perform or control performance of one or more operations), a field-programmable gate array (FPGA), or an application-specific integrated circuit (ASIC). In some other instances, the database 104 may be implemented using software.

The user-end device 106 may include suitable logic, circuitry, interfaces, and/or code that may be configured to generate or receive a dataset, for example, the dataset 110A. For example, the user-end device 106 may include a web-client software/application or an electronic mail software, through which the user-end device 106 may receive the dataset 110A. Additionally, or alternatively, the user-end device 106 may include a spreadsheet software or a data repository software, through which the dataset 110A may be generated or edited based on a user input from the user 116. The user-end device 106 may upload the generated or received dataset 110A to the electronic device 102. In addition, the user-end device 106 may upload the generated or received dataset 110A to the database 104 for storage. The user-end device 106 may be further configured to receive the textual explanation of the set of patterns, which may be determined from the dataset 110A, by the electronic device 102. The user-end device 106 may render the received the textual explanation of the set of patterns on a display screen of the user-end device 106 for the user 116. In some embodiments, the user-end device 106 may receive a query from the user 116 to determine the set of patterns from the dataset 110A and determine the textual explanation of the set of patterns. The user-end device 106 may further send the query to the electronic device 102 and initiate the determination of the set of patterns and the determination of the textual explanation by the electronic device 102. Examples of the user-end device 106 may include, but are not limited to, a mobile device, a desktop computer, a laptop, a computer workstation, a computing device, a mainframe machine, a server, such as a cloud server, and a group of servers. Although in FIG. 1, the user-end device 106 is separated from the electronic device 102; however, in some embodiments, the user-end device 106 may be integrated in the electronic device 102, without a deviation from the scope of the disclosure.

The communication network 108 may include a communication medium through which the electronic device 102, the device hosting the database 104, and devices related to the set of warehouses 116A to 116H and the set of vehicles 118A and 118B may communicate with each other. The communication network 108 may be one of a wired connection or a wireless connection. Examples of the communication network 108 may include, but are not limited to, the Internet, a cloud network, Cellular or Wireless Mobile Network (such as Long-Term Evolution and 5G New Radio), a satellite network (such as, a network of one or more low-earth orbit satellites) a Wireless Fidelity (Wi-Fi) network, a Personal Area Network (PAN), a Local Area Network (LAN), or a Metropolitan Area Network (MAN). Various devices in the environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The set of statistical analysis tools 112 may include suitable logic, circuitry, interfaces, and/or code that may be configured to perform statistical analysis of a dataset, for example, the dataset 110A. The set of statistical analysis tools 112 may include predefined programs or sub-routines, which may be configured to determine statistical information associated with the dataset 110A. For example, the predefined statistical program may correspond to a program to determine various measures of central tendency associated with datapoints related to a variable of a set of variables in the dataset 110A. Examples of such measures of central tendency may include mean, mode, and median. Further, the predefined statistical program may determine minimum and maximum values associated with the variable. The set of statistical analysis tools 112 may correspond to a set of algorithms to determine or explain at least one of, but not limited to, an ordinal value, a skewness, a kurtosis, a data consistency, an interesting value, an outlier value, a categorical unordered univariate analysis, a univariate analysis, a bivariate analysis, a multi-variate analysis, or a target value. The set of statistical analysis tools 112 may be stored on the electronic device 102 and executed by the electronic device 102. In an embodiment, the operations of set of statistical analysis tools 112 may be executed using hardware including a processor, a microprocessor (e.g., to perform or control performance of one or more operations), a field-programmable gate array (FPGA), or an application-specific integrated circuit (ASIC). In some other instances, the set of statistical analysis tools 112 may be implemented using software.

The natural language model 114 may include suitable logic, circuitry, interfaces, and/or code that may be configured to determine a textual explanation associated with a determined set of patterns. The natural language model 114 may be applied on a set of predefined templates (that may be retrieved based on the determined set of patterns) and further applied on the statistical information (that may be determined from the dataset 110A). Based on the application of the natural language model 114, the textual explanation associated with the determined set of pattern may be determined. The natural language model 114 may correspond to at least one of, but not limited to, a Bi-directional Encoder Representations from Transformers (BERT) model, a Generative Pre-trained Transformer 3 (GPT-3) model, a GPT-2 model, an "XLNet" model (an extension of a Transformer-XL model), a Robustly Optimized BERT Pretraining Approach (ROBERTa) model, or an "A Lite BERT" (ALBERT) model.

In an embodiment, the natural language model 114 may correspond to a neural network model, such as, a deep learning model. The neural network model may be a computational network or a system of artificial neurons, arranged in a plurality of layers, as nodes. The plurality of layers of neural network model may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before or while training the neural network model on a training dataset (for example, the dataset 110A).

Each node of the neural network model may correspond to a mathematical function (e.g., a sigmoid function or a rectified linear unit) with a set of parameters, tunable during training of the neural network model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to the same or a different mathematical function.

In training of the neural network model, one or more parameters of each node of the neural network model may be updated based on whether an output of the final layer for a given input (from the training dataset, such as, the dataset 110A) matches a correct result based on a loss function for the neural network model. The above process may be repeated for the same or a different input till a minima of loss function may be achieved, and a training error may be minimized. Several methods for training are known in art, for example, gradient descent, stochastic gradient descent, batch gradient descent, gradient boost, meta-heuristics, and the like.

The neural network model may include electronic data, such as, for example, a software program, code of the software program, libraries, applications, scripts, or other logic or instructions for execution by a processing device (such as a processor 204 of the electronic device 102 of FIG. 2). The neural network model may include code and routines configured to enable a computing device including the processor to perform one or more tasks such as, the generation of the textual explanation based on the retrieved set of predefined templates and the determined statistical information. Additionally, or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software.

Examples of the neural network model may include, but are not limited to, a deep neural network (DNN), an artificial neural network (ANN), a fully connected neural network, a deep Bayesian neural network, a Recurrent Neural Network (RNN), Gated Recurrent Unit (GRU)-based RNN, a Convolution Neural Network (CNN)-Recurrent Neural Network (CNN-RNN), a Long Short-Term Memory (LSTM) network based RNN, LSTM+ANN, a Connectionist Temporal Classification (CTC) based RNN, and/or a combination of such networks. In some embodiments, the neural network model may include numerical computation techniques using data flow graphs. In certain embodiments, the neural network model may be based on a hybrid architecture of multiple Deep Neural Networks (DNNs). In some embodiments, the neural network model may be a Dilated Convolution Neural Network model. The neural network model may be associated with an Attentive model that may correspond to an Attentive Convolutional Long Short-Term Memory Network (LSTM) model.

In operation, the electronic device 102 may be configured to receive a dataset (such as, the dataset 110A) including datapoints related to a set of variables. The electronic device 102 may be configured to select a statistical analysis tool from the set of statistical analysis tools 112 to analyze the received dataset 110A. For example, the electronic device 102 may select "median" as a statistical analysis tool from the set of statistical analysis tools 112. The electronic device 102 may be configured to select a first variable of the set of variables related to the datapoints in the dataset 110A, for the statistical analysis of the dataset 110A. For example, the electronic device 102 may select "household income" from the dataset 110A (e.g., demographic information of residents of a region), as the first variable, for the analysis of the dataset 110A. The electronic device 102 may be configured to apply the selected statistical analysis tool (e.g., "median") on a first set of datapoints (e.g., "residents who are employed in a government organization") related to the selected first variable (e.g., "household income"). The electronic device 102 may be configured to determine statistical information related to the selected first variable, based on the application of the selected statistical analysis tool on the first set of datapoints. For example, the statistical information determined by the electronic device 102 may include information such as, a median household income value of residents of the region who may be employed in a government organization.

The electronic device 102 may be configured to determine a set of patterns associated with a first set of datapoints, based on the determined statistical information related to the selected first variable. For example, the set of patterns determined by the electronic device 102 may include information such as, a count of people whose household income value lies in a certain income range (such as, a high-income bracket), an income range associated with the greatest number of people, and so on. The electronic device 102 may be configured to retrieve a first set of predefined templates associated with the determined set of patterns. For example, the first set of predefined templates may include a predefined text (such as, "Information related to high-income households:") associated with a certain pattern (e.g., the count of people whose household income value lies in a high-income bracket).

The electronic device 102 may be configured to apply the natural language model 114 on the retrieved first set of predefined templates and on the determined statistical information. Further, the electronic device 102 may be configured to determine a first textual explanation of the determined set of patterns, based on the application of the natural language model 114 on the retrieved first set of predefined templates and on the determined statistical information. For example, the electronic device 102 may apply a BERT-based language model on a predefined template, such as, "Information related to high-income households:" and on the determined statistical information (such as, top 10-percentile household incomes). Based on the application of the BERT-based language model, the electronic device 102 may determine the first textual explanation such as, "There are 'N' number of government employees who reside in region 'X' and have a household income in a top income bracket of top-10 percentile in the region. The median household income of the 'N' government employees is USD 'Y'". The electronic device 102 may be configured to control a display device (e.g., a display device 206A of the electronic device 102 of FIG. 2) to render the determined first textual explanation. The automated EDA is further described, for example, in FIGS. 3, 4, 5, 6, 7, 8, 9, 10, 11, 12, 13, 14, 15, 16, 17, 18, 19A, 19B, 20A, and 20B.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 104. In addition, in some embodiments, the functionality of each of the database 104 may be incorporated into the electronic device 102, without a deviation from the scope of the disclosure.

FIG. 2 is a block diagram that illustrates an exemplary electronic device for an automated exploratory data analysis (EDA), in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, an input/output (I/O) device 208 (including a display device 208A), and a network interface 210. The electronic device 102 may further include the set of statistical analysis tools 112 and/or the natural language model 114.

The processor 204 may include suitable logic, circuitry, and interfaces that may be configured to execute a set of instructions stored in the memory 206. The processor 204 may be configured to execute program instructions associated with different operations to be executed by the electronic device 102. For example, some of the operations may include the reception of the dataset 110A, the selection of the statistical tool, the selection of the first variable, the application of the selected statistical tool, the determination of the statistical information, the determination of the set of patterns, and the retrieval of the first predefined set of templates. The operations may further include application of the natural language model 114, the determination of the first textual explanation, and the control of the display of the first textual explanation. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may be configured to store the set of statistical analysis tools 112 and the natural language model 114. The memory 206 may further store the retrieved dataset 110A, the determined statistical information, the determined set of patterns, the retrieved first set of predefined templates, and a determined textual explanation (e.g., the first textual explanation). Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive an input from the user 116 and provide an output based on the received input. For example, the I/O device 208 may receive the dataset 110A, based on a user input from the user 116. Further, the I/O device 208 may receive another user input indicative of a selection of the first variable from the set of variables. In addition, another user input may be received, which may indicate a selection of the statistical tool from the set of statistical analysis tools 112. Further, the I/O device 208 may render the statistical information and/or a textual explanation (e.g., a first textual explanation) of a determined pattern as an output for the user 116. The I/O device 208 which may include various input and output devices, may be configured to communicate with the processor 204. Examples of the I/O device 208 may include, but are not limited to, a touch screen, a keyboard, a mouse, a joystick, a microphone, a display device (e.g., the display device 208A), and a speaker.

The display device 208A may include suitable logic, circuitry, and interfaces that may be configured to display the statistical information and/or a textual explanation (e.g., a first textual explanation) of a determined pattern. The display device 208A may be a touch screen which may enable a user to provide a user-input via the display device 208A. The touch screen may be at least one of a resistive touch screen, a capacitive touch screen, or a thermal touch screen. The display device 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208A may refer to a display screen of a head mounted device (HMD), a smart-glass device, a see-through display, a projection-based display, an electro-chromic display, or a transparent display.

The network interface 210 may include suitable logic, circuitry, and interfaces that may be configured to facilitate communication between the processor 204 and a device hosting the database 104 (and/or any other device in the environment 100), via the communication network 108. The network interface 210 may be implemented by use of various known technologies to support wired or wireless communication of the electronic device 102 with the communication network 108. The network interface 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 210 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
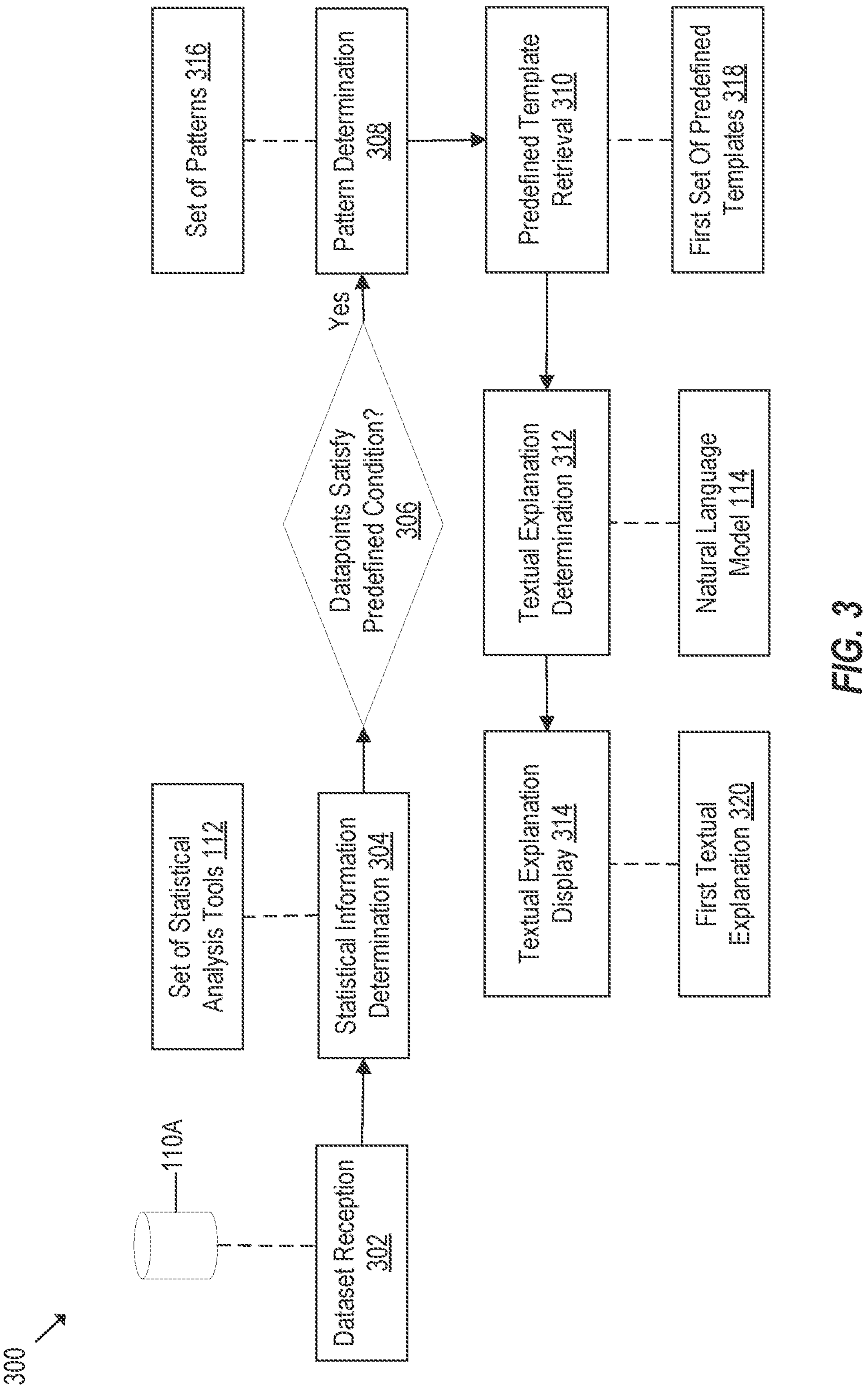
FIG. 3 is a diagram that illustrates an execution pipeline for automated exploratory data analysis (EDA)

FIG. 3 is a diagram that illustrates an execution pipeline for automated exploratory data analysis (EDA), in accordance with an embodiment of the disclosure. FIG. 3 is described in conjunction with elements from FIG. 1 and FIG. 2. With reference to FIG. 3, there is shown an execution pipeline 300. The exemplary execution pipeline 300 may include a set of operations that may be executed by one or more components of FIG. 1, such as, the electronic device 102. The operations may include an operation 302 for dataset reception, an operation 304 for statistical information determination, an operation 306 for condition comparison, an operation 308 for pattern determination, an operation 310 for predefined template retrieval, an operation 312 for textual explanation determination, and an operation 314 for textual explanation display. The set of operations may be performed by the electronic device 102 for automated EDA, as described herein.

At 302, the operation for dataset reception may be executed. In an embodiment, the processor 204 may be configured to receive a dataset (e.g., the dataset 110A) from the database 104. The processor 204 may receive a user input indicative of a selection of the dataset. Based on the received user input, the processor 204 may send a query corresponding to the dataset to the database 104. Based on the query, the database 104 may retrieve the dataset (e.g., the dataset 110A) from the one or more datasets stored on the database 104 and send the retrieved dataset (i.e., the dataset 110A) to the electronic device 102. The processor 204 may receive the dataset from the database 104 and store the received dataset (i.e., the dataset 110A) in the memory 206. In another scenario, the dataset (e.g., the dataset 110A) may be already pre-stored in the memory 206 of the electronic device 102. In such case, the processor 204 may extract the dataset 110A from memory 206, based on the received user input indicative of the selection of the dataset 110A. The received (or extracted) dataset (e.g . . . , the dataset 110A) may include datapoints related to related to a set of variables. The set of variables may correspond to features of the dataset 110A.

At 304, the operation for statistical information determination may be executed. In an embodiment, the processor 204 may be configured to select a statistical analysis tool (e.g., "a median determination sub-routine") from a set of statistical analysis tools (e.g., the set of statistical analysis tools 112) to analyze the received dataset (e.g., the dataset 110A). The memory 206 may store the set of statistical analysis tools 112 including a set of sub-routines configured to determine various statistical values from datapoints of datasets. For example, the processor 204 may select "median" as a parameter to a statistical analysis algorithm from the set of statistical analysis tools 112. The selection of the statistical analysis algorithm for analysis of the received dataset 110A may be based on a user input from the user 116. In another scenario, the processor 204 may automatically select the statistical analysis tool based on a certain predefined rule. In an example, the processor 204 may select "median", "quartile", or "percentile" as the statistical analysis tool to be used to analyze the dataset 110A. The selection of the statistical analysis tool may be based on the type of analysis to be performed on the dataset 110A. For example, to determine measures of central tendency from the dataset 110A, the "median" may be chosen as the statistical analysis tool, while to determine outliers from the dataset 110A, the "quartile" may be chosen as the parameter to a statistical analysis algorithm.

The processor 204 may be further configured to select a first variable of the set of variables related to the datapoints of the dataset 110A. Each of the set of variables may correspond to a feature of the dataset 110A. The first variable may correspond to a feature that may be selected from the set of variables for analysis of the dataset 110A. For example, a variable, such as, "household income" may be selected as the first variable from the features of the dataset 110A (e.g., a dataset including demographic information associated with people residing in a region). The selection of the first variable may be based on a user input from the user 116. In an alternate scenario, the first variable may be selected based on a certain predefined rule. For example, a variable of a numeric datatype may be selected as the first variable by the processor 204.

The processor 204 may be configured to apply the selected statistical analysis tool on a first set of datapoints related to the selected first variable. For example, the selected statistical tool may correspond to "median" and the first set of datapoints may correspond to "residents in a certain region who are employed in a government organization". The selected first variable may correspond to, for example, "household income" of the residents. Thus, in the current scenario, the processor 204 may apply a "median determination sub-routine" on the first variable "household income" for the first set of datapoints (i.e., records of government employees who reside in the region). The processor 204 may be configured to determine statistical information related to the selected first variable, based on the application of the selected statistical analysis tool on the first set of datapoints. For example, the statistical information determined by the processor 204 may include information such as, a median household income value of residents of the region who may be employed in a government organization.

At 306, the operation for condition comparison may be executed. In an embodiment, the processor 204 may be configured to determine whether the datapoints (e.g., the first set of datapoints) of the dataset 110A satisfy a predefined condition, based on the determined statistical information. For example, the statistical information may include information about a set of datapoints from the first set of datapoints that may correspond to outlier values of the selected first variable. In an embodiment, the outlier values may correspond to values in the top 1 percentile or bottom 1 percentile of the first set of datapoints. In such case, the predefined condition may correspond to 1 percentile. The processor 204 may compare a percentile rank associated with each value in the first set of datapoints to the predefined condition (e.g., a top or bottom 1 percentile rank) to determine such outlier values. In case, the set of datapoints of the dataset 110A satisfy the predefined condition (e.g., a top or bottom 1 percentile rank), the operation 308 may be executed for the set of datapoints of the dataset 110A. Thus, the operation 308 may be executed for the set of datapoints that correspond to the outlier values (i.e., the top or bottom 1 percentile rank) of the first set of datapoints of the dataset 110A. The predefined condition may correspond to various other types of thresholds, based on the statistical analysis tool used to determine the statistical information. For example, the predefined condition may correspond to a threshold related to skewness or a threshold related to kurtosis, based on whether the statistical information includes information about skewness or kurtosis, respectively. In case, the processor 204 determines that the first set of datapoints satisfies the predefined condition, the operation 308 for pattern determination may be executed.

At 308, the operation for pattern determination may be executed. In an embodiment, the processor 204 may be configured to determine a set of patterns (e.g., a set of patterns 316) associated with the first set of datapoints, based on the determined statistical information related to the selected first variable. For example, based on the statistical information related to government employees residing in a certain region, the processor 204 may determine patterns including information such as, a count of people whose household income value lies in a certain income range (such as, a high-income bracket), an income range associated with the greatest number of people, and so on. The determination of the set of patterns is described further, for example, in FIGS. 8, 9, 10, 11, 12, 15, 16, and 17.

At 310, the operation for predefined template retrieval may be executed. In an embodiment, the processor 204 may be configured to retrieve a first set of predefined templates (e.g., a first set of predefined templates 318) associated with the determined set of patterns 316. In an embodiment, the first set of predefined templates 318 may be stored in the database 104. The processor 204 may transmit a query including information associated with the determined set of patterns 316 to the database 104. The database 104 may retrieve the first set of predefined templates 318, based on the receipt of such query from the electronic device 102 and may send the retrieved first set of predefined templates 318 to the electronic device 102. The processor 204 may store the received the first set of predefined templates 318 in the memory 206. In another scenario, the first set of predefined templates 318 may be pre-stored in the memory 206. Based on the determined set of patterns 316, the processor 204 may retrieve the first set of predefined templates 318 from the memory 206. In an example, the first set of predefined templates 318 may include a predefined text (such as, "Information related to high-income households:") associated with a certain pattern (e.g., the count of people whose household income value lies in a high-income bracket). Examples of the first set of predefined templates are described further, for example, in FIGS. 8, 9, 10, 11, 12, 15, 16, and 17.

At 312, the operation for textual explanation determination may be executed. In an embodiment, the processor 204 may be configured to apply a natural language model (e.g., the natural language model 114) on the retrieved first set of predefined templates 318 and on the determined statistical information. Further, the processor 204 may be configured to determine a first textual explanation (e.g., a first textual explanation 320) of the determined set of patterns 316, based on the application of the natural language model 114 on the retrieved first set of predefined templates 318 and on the determined statistical information. For example, the processor 204 may apply a Bi-directional Encoder Representations from Transformers (BERT)-based language model on a predefined template, such as, "Information related to high-income households:" and on the determined statistical information (such as, top 10-percentile household incomes). Based on the application of the BERT-based language model or a transformer-based language model, the processor 204 may determine the first textual explanation 320 such as, "There are 'N' number of government employees who reside in region 'X' and have a household income in a top income bracket of top-10 percentile in the region. The median household income of the 'N' government employees is USD 'Y'". The determination of the first textual explanation is described further, for example, in FIGS. 8, 9, 10, 11, 12, 15, 16, and 17.

At 314, the operation for textual explanation display may be executed. The processor 204 may be configured to control a display device (e.g., the display device 206A of the electronic device 102 of FIG. 2) to render the determined first textual explanation 320. The processor 204 may render the first textual explanation 320 on the display device 208A for the user 116. The first textual explanation 320 may be a natural language easy-to-understand text that may explain the set of patterns 316 that may be determined from the first set of datapoints related to the first variable associated with the dataset 110A.

Typically, prior to use of a dataset in a machine learning (ML) pipeline, the dataset may be required to be analyzed to determine trends from the dataset and to perform feature engineering on the dataset, based on the determined trends. Based on feature engineering, an ML model associated with the ML pipeline may be trained and fine-tuned on the dataset. The accuracy of the trained and fine-tuned ML model may depend on how well feature engineering has been performed on the dataset, and the quality of the feature engineering may be based on the data trend determination. Typically, the analysis of the dataset for data trend determination may require multiple user inputs from an expert user, such as, a data scientist, a domain expert, or a data engineer. To determine the trends, the expert user may need to manually inspect the dataset heuristically, by use of one or more analysis tools. Such manual inspection of the dataset may be a non-trivial and time-consuming task, which may require a significant effort from the expert user, especially in case of real-world datasets, which may be large in size and may have a high complexity due to a large number of features.

The disclosed electronic device 102, on the other hand, may automatically determine statistical information associated with a variable (e.g., the selected first variable) related to datapoints in a dataset (e.g., the dataset 110A). Further, the disclosed electronic device 102 may determine a set of patterns (e.g., the set of patterns 316) associated with the datapoints related to the variable, based on the determined statistical information. A set of predefined templates (e.g., the first set of predefined templates 318) related to the determined set of patterns 316 may be retrieved and a natural language model (e.g., the natural language model 114) may be applied on the retrieved set of patterns 316 and on the determined statistical information. A textual explanation (e.g., the first textual explanation 320) of the determined set of patterns may be determined based on the application of the natural language model 114. The textual explanation may be presented to a user (e.g., the user 116), such as, the expert user (e.g., a data scientist). The textual explanation of the set of patterns, which may be determined from the dataset, may include easy-to-understand natural language insights into various data trends. The manual task of data trend inspection, which may be consume a lot of time and effort of the expert user, may thereby be automated and simplified for the expert user.

Figure 4:
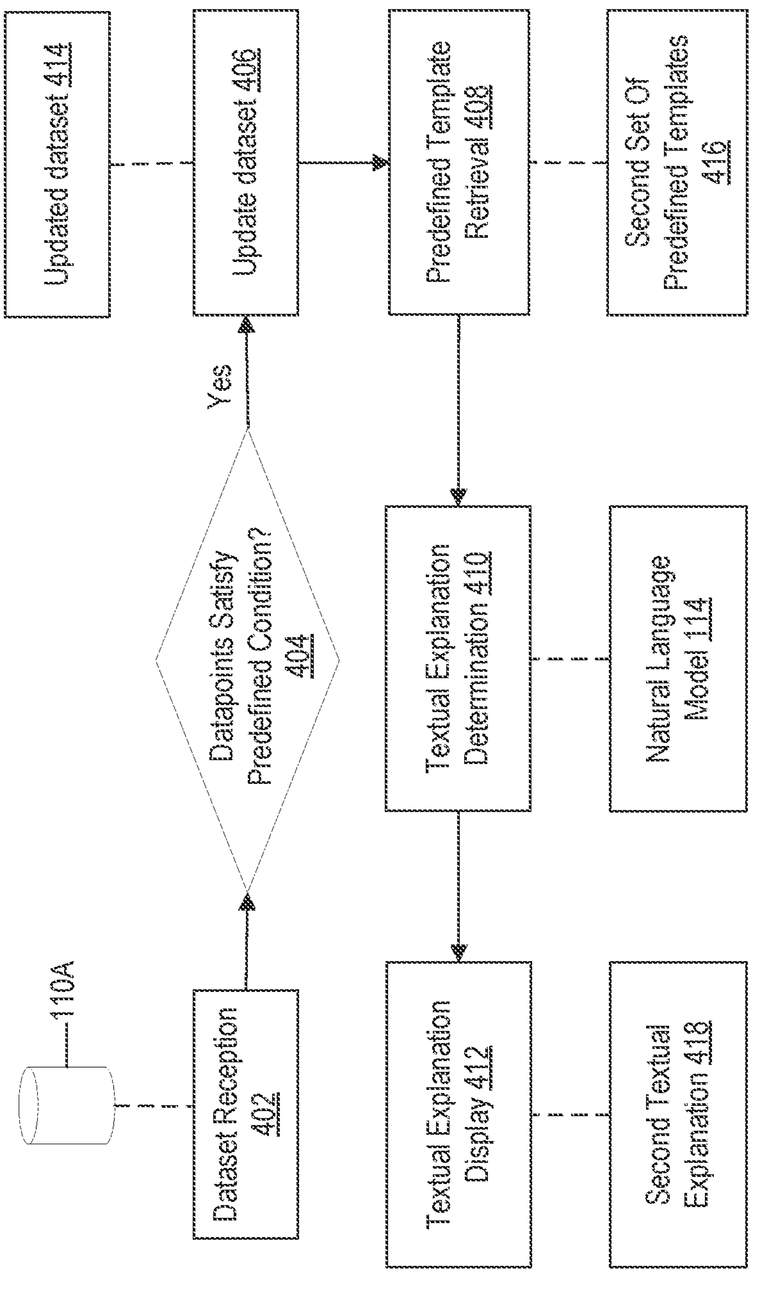
FIG. 4 is a diagram that illustrates an execution pipeline for automated dataset revision and textual explanation generation.

FIG. 4 is a diagram that illustrates an execution pipeline for automated dataset revision and textual explanation generation, in accordance with an embodiment of the disclosure. FIG. 3 is described in conjunction with elements from FIG. 1, FIG. 2, and FIG. 3. With reference to FIG. 4, there is shown an execution pipeline 400. The exemplary execution pipeline 400 may include a set of operations that may be executed by one or more components of FIG. 1, such as, the electronic device 102. The operations may include an operation 402 for dataset reception, an operation 404 for condition check, an operation 406 for dataset update, an operation 408 for predefined template retrieval, an operation 410 for textual explanation determination, and an operation 412 for textual explanation display. The set of operations may be performed by the electronic device 102 for automated dataset revision and textual explanation generation, as described herein.

At 402, the operation for dataset reception may be executed. In an embodiment, the processor 204 may be configured to receive a dataset (e.g., the dataset 110A) from the database 104. The processor 204 may receive a user input indicative of a selection of the dataset. Based on the received user input, the processor 204 may send a query corresponding to the dataset to the database 104. Based on the query, the database 104 may retrieve the dataset (e.g., the dataset 110A) from the one or more datasets stored on the database 104 and send the retrieved dataset (i.e., the dataset 110A) to the electronic device 102. The processor 204 may receive the dataset from the database 104 and store the received dataset (i.e., the dataset 110A) in the memory 206. In another scenario, the dataset (e.g., the dataset 110A) may be already pre-stored in the memory 206 of the electronic device 102. In such case, the processor 204 may extract the dataset 110A from memory 206, based on the received user input indicative of the selection of the dataset 110A. The received (or extracted) dataset (e.g., the dataset 110A) may include datapoints related to related to a set of variables. The set of variables may correspond to features of the dataset 110A.

At 404, the operation for condition check may be executed. In an embodiment, the processor 204 may be configured to determine whether the datapoints (e.g., the first set of datapoints) of the dataset 110A satisfy a predefined condition. The predefined condition may be associated with a first datatype associated with the selected first variable. For example, the processor 204 may determine whether a datatype of the first set of datapoints corresponds to the first datatype (such as, a numeric datatype). In an embodiment, the processor 204 may determine that the first set of datapoints satisfy the predefined condition, in case a majority of datapoints correspond to the first datatype (e.g., a numeric datatype), and remaining datapoints belong to a second datatype (e.g., a Boolean datatype), such that the second datatype is convertible to the first datatype. For example, a Boolean datatype may be convertible to a numeric datatype. In case, the processor 204 determines that the first set of datapoints satisfies the predefined condition, the operation 406 for dataset update may be executed.

At 406, the operation for dataset update may be executed. In an embodiment, the processor 204 may be configured to automatically update a second datatype of one or more of the first set of datapoints to the first datatype, based on the determination that the first set of datapoints satisfies the predefined condition. For example, the first set of datapoints may correspond to a mixed data of an object datatype. The first set of datapoints may satisfy the predefined condition that a majority of datapoints may correspond to the first datatype (e.g., a numeric datatype), and remaining datapoints may correspond to a second datatype (e.g., a Boolean datatype), such that the second datatype may be converted to the first datatype. In case, the predefined condition is satisfied, the majority of the first set of datapoints may correspond to the first datatype and the second datatype of the remaining of the first set of datapoints may be convertible to the first datatype. The processor 204 may identify the remaining of the first set of datapoints that belong to the second datatype. Further, the processor 204 may update the second datatype of the remaining (one or more) of the first set of datapoints to the first datatype. For example, the processor 204 may update datapoints that belong to a Boolean datatype to corresponding numeric values, based on a conversion of "True" to "1" and "False" to "0". The processor 204 may be configured to obtain an updated dataset (e.g., an updated dataset 414) based on the update of the second datatype of the one or more of the first set of datapoints to the first datatype. Thus, based on the conversion of the datatype of the remaining (one or more) of the first set of datapoints from the second datatype to the first datatype, the processor 204 may update the values of the selected first variable in the dataset 110A and obtain the updated dataset 414.

In an embodiment, the predefined condition of the operation 404 may correspond to a set of predefined rules associated with datatype conversion and a context of values of the first set of datapoints. For example, in certain cases, a datatype of a majority of values of the first set of datapoints of the first variable may not be a desirable datatype for all datapoints of the first variable due to the context of non-majority values of the first set of datapoints. In such case, the conversion of the second datatype of non-majority values of the first set of datapoints to the first datatype of the majority values of the first set of datapoints may lead to information loss. For example, consider a dataset, such as, "[Yes, 1, Yes, No, 2, 3, Yes, Yes, 4, Yes, No, 5]". There may be two sets of unique datapoints of alphabet/Boolean datatype (i.e., "[Yes, No]") and numeric datatype (i.e., "[1, 2, 3, 4, 5]") associated with the dataset. Though the alphabet/Boolean may be in majority, in the current case, the numeric values may be important and may have more attributable information. Hence, conversion of the numeric datatype to the alphabet/Boolean datatype may lead to information loss. In such case, based on a predefined rule or user input from the user 116, the alphabet/Boolean datatype values (i.e., "[Yes, No]") may be converted to corresponding numeric datatype values, such as, "1" and "0", respectively. The dataset update is described further, for example, in FIG. 13.

At 408, the operation for predefined template retrieval may be executed. In an embodiment, the processor 204 may be configured to retrieve a second set of predefined templates (e.g., a second set of predefined templates 416) associated with the predefined condition. In an embodiment, the second set of predefined templates 416 may be stored in the database 104. The processor 204 may transmit a query including information associated with the predefined condition to the database 104. The database 104 may retrieve the second set of predefined templates 416, based on the receipt of such query from the electronic device 102 and may send the retrieved second set of predefined templates 416 to the electronic device 102. The processor 204 may store the received the second set of predefined templates 416 in the memory 206. In another scenario, the second set of predefined templates 416 may be pre-stored in the memory 206. Based on the predefined condition, the processor 204 may retrieve the second set of predefined templates 416 from the memory 206. In an example, the second set of predefined templates 416 may include a predefined text (such as, "Inconsistent values for numeric type variable") associated with the predefined condition associated with the first datatype (e.g., a numeric datatype). Examples of the second set of predefined templates are described further, for example, in FIG. 14.

At 410, the operation for textual explanation determination may be executed. In an embodiment, the processor 204 may be configured to apply a natural language model (e.g., the natural language model 114) on the retrieved second set of predefined templates 416 and on the second datatype of the one or more of the first set of datapoints. Further, the processor 204 may be configured to automatically determine a second textual explanation (e.g., a second textual explanation 418) of the updated dataset 414, based on the application of the natural language model 114 on the retrieved second set of predefined templates 416 and on the second datatype. For example, the processor 204 may apply a Bi-directional Encoder Representations from Transformers (BERT)-based language model on a predefined template, such as, "Inconsistent values for numeric type variable" and on the second datatype (such as, a Boolean datatype associated "M" number of datapoints out of a total of "N" datapoints of the variable). Based on the application of the BERT-based language model, the processor 204 may determine the second textual explanation 418 such as, "Inconsistent values for numeric type variable! There are 'M' number of Boolean datapoints related to the variable "V", out of "N" total number of datapoints of the variable "V". As the Boolean datatype is convertible to the numeric datatype, the values of the variable "V" can be made consistent". The determination of the second textual explanation is described further, for example, in FIG. 14.

At 412, the operation for textual explanation display may be executed. The processor 204 may be configured to control a display device (e.g., the display device 206A of the electronic device 102 of FIG. 2) to render the determined second textual explanation 418. The processor 204 may render the second textual explanation 418 on the display device 208A for the user 116. The second textual explanation 418 may be a natural language easy-to-understand text that may explain the revisions (e.g., datatype conversions) in the updated dataset 414.

Figure 5:
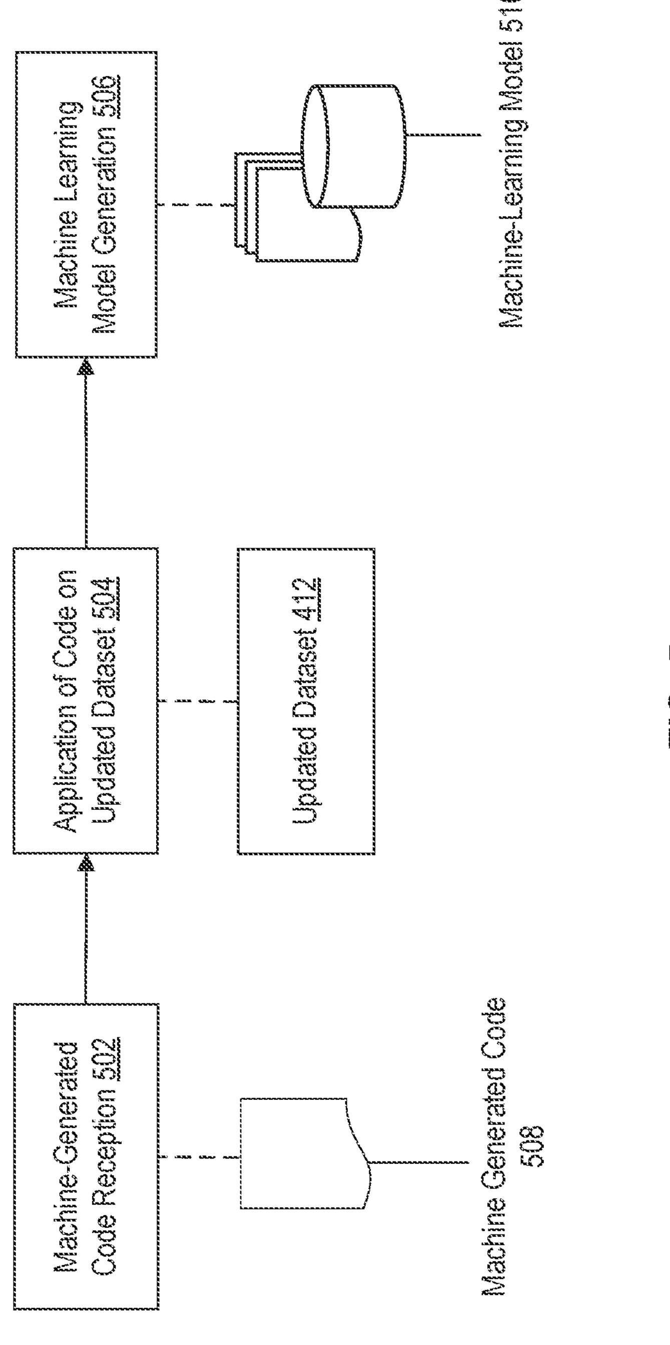
FIG. 5 is a diagram that illustrates an execution pipeline for machine learning model generation based on automated dataset revision and machine-generated code.

FIG. 5 is a diagram that illustrates an execution pipeline for machine learning model generation based on automated dataset revision and machine-generated code, in accordance with an embodiment of the disclosure. FIG. 5 is described in conjunction with elements from FIG. 1, FIG. 2, FIG. 3, and FIG. 4. With reference to FIG. 5, there is shown an execution pipeline 500. The exemplary execution pipeline 500 may include a set of operations that may be executed by one or more components of FIG. 1, such as, the electronic device 102. The operations may include an operation 502 for machine-generated code reception, an operation 504 for application of code on updated dataset, and an operation 506 for machine learning model generation. The set of operations may be performed by the electronic device 102 for machine learning model generation based on automated dataset revision and machine-generated code, as described herein.

At 502, the operation for machine-generated code reception may be executed. In an embodiment, the processor 204 may be configured to receive a machine-generated code 508 associated with a machine-learning (ML) pipeline. In an embodiment, the machine-generated code 508 may be generated using various techniques such as, an ML-based technique to generate code, an AutoML technique or a SapientML technique. The processor 204 may store the received machine-generated code 508 in the memory 206.

At 504, the operation for application of code on updated dataset may be executed. In an embodiment, the processor 204 may be configured to apply the received machine-generated code 508 on the obtained updated dataset (e.g., the updated dataset 414). The update of the dataset 110A to obtain the updated dataset 414 is described further, for example, in FIG. 4 (at 406). The processor 204 may apply the received machine-generated code 508 on the obtained updated dataset 414, by plugging-in the updated dataset 414 as an input to the received machine-generated code 508. The machine-generated code 508 may execute on the obtained updated dataset 414 to produce an output.

At 506, the operation for machine learning model generation may be executed. In an embodiment, the processor 204 may be configured to generate an ML model 510 based on the application of the received machine-generated code 508 on the obtained updated dataset 414. The ML model 510 may correspond to a higher dimensional space (i.e., a hyperspace or a hyperplane), which may be associated with a predefined non-linear decision boundary associated with a pre-trained ML model and an input dataset. The predefined non-linear decision boundary may be determined based on the application of the pre-trained ML model (which may correspond to the received machine-generated code 508) on the input dataset (e.g., the updated dataset 414). The ML model 510 may reduce complexity and time associated with classification or regression tasks corresponding to the pre-trained ML model. An example of textual explanation that may be generated based on analysis of machine-generated code is described further, for example, in FIG. 20B.

Figure 6:
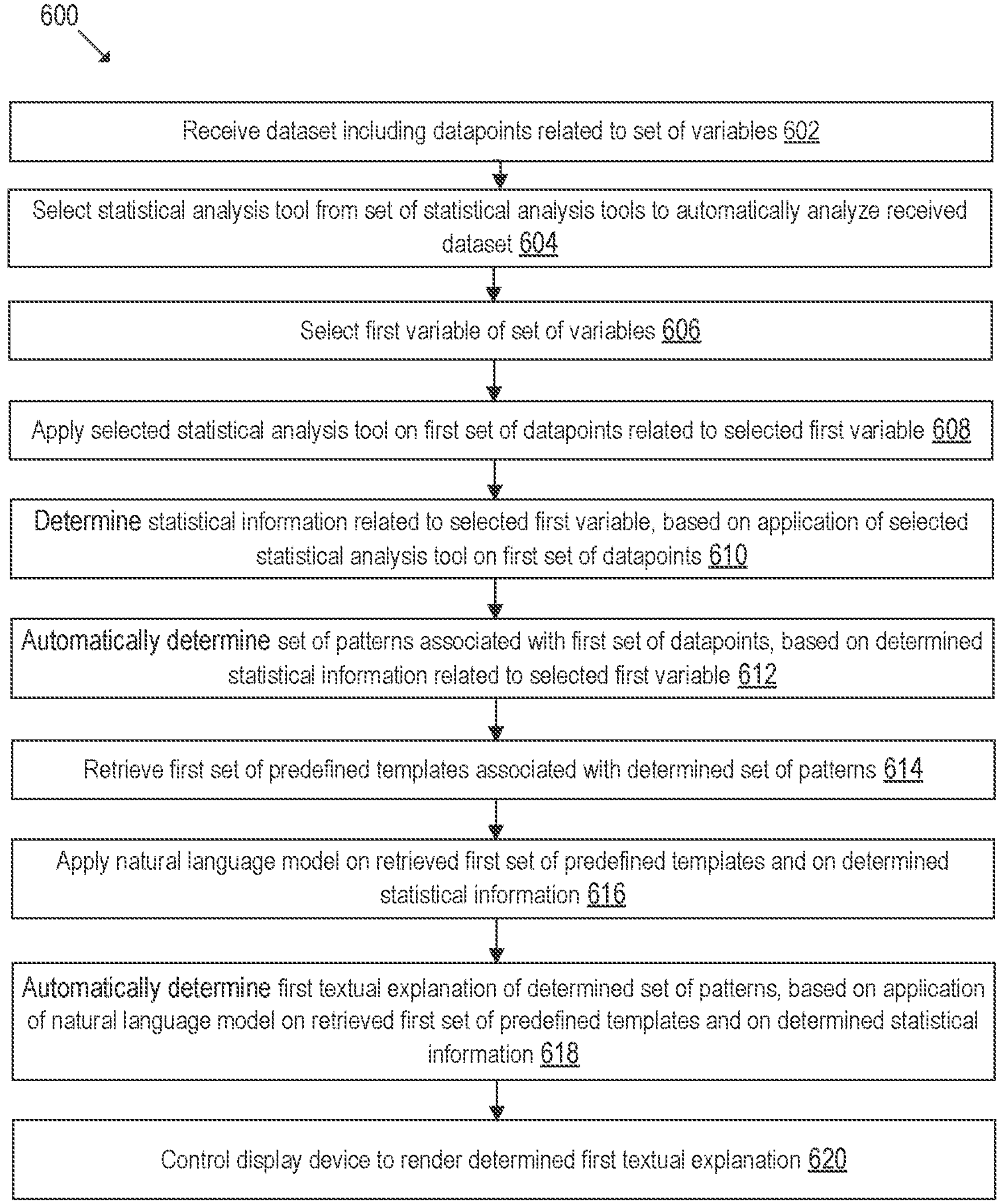
FIG. 6 is a diagram that illustrates a flowchart of an example method for automated exploratory data analysis.

FIG. 6 is a diagram that illustrates a flowchart of an example method for automated exploratory data analysis, in accordance with an embodiment of the disclosure. FIG. 6 is described in conjunction with elements from FIG. 1, FIG. 2, FIG. 3, FIG. 4, and FIG. 5. With reference to FIG. 6, there is shown a flowchart 600. The method illustrated in the flowchart 600 may start at 602 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, a dataset including datapoints related to a set of variables may be received. In an embodiment, the processor 204 may be configured to receive the dataset (e.g., the dataset 110A) including the datapoints related to the set of variables. In an embodiment, the dataset 110A may be received from the database 104. The processor 204 may receive a user input indicative of a selection of the dataset 110A. Based on the received user input, the processor 204 may send a query corresponding to the dataset 110A to the database 104. Based on the query, the database 104 may retrieve the dataset (e.g., the dataset 110A) from the one or more datasets stored on the database 104 and send the retrieved dataset (i.e., the dataset 110A) to the electronic device 102. The processor 204 may receive the dataset from the database 104 and store the received dataset (i.e., the dataset 110A) in the memory 206. In another scenario, the dataset (e.g., the dataset 110A) may be already pre-stored in the memory 206 of the electronic device 102. In such case, the processor 204 may extract the dataset 110A from memory 206, based on the received user input indicative of the selection of the dataset 110A. The received (or extracted) dataset (e.g., the dataset 110A) may include datapoints related to related to the set of variables, which may correspond to features of the dataset 110A.

At block 604, a statistical analysis tool may be selected from a set of statistical analysis tools to automatically analyze the received dataset. In an embodiment, the processor 204 may be configured to select a statistical analysis tool (e.g., "a median determination sub-routine") from a set of statistical analysis tools (e.g., the set of statistical analysis tools 112) to automatically analyze the received dataset (e.g., the dataset 110A). The memory 206 may store the set of statistical analysis tools 112 including a set of sub-routines configured to determine various statistical values from datapoints of datasets. For example, the processor 204 may select "median" as a statistical analysis tool from the set of statistical analysis tools 112. The selection of the statistical analysis tool for analysis of the received dataset 110A may be based on a user input from the user 116. In another scenario, the processor 204 may automatically select the statistical analysis tool based on a certain predefined rule. In an example, the processor 204 may select "median", "quartile", or "percentile" as the statistical analysis tool to be used to analyze the dataset 110A. The selection of the statistical analysis tool may be based on the type of analysis to be performed on the dataset 110A. For example, to determine measures of central tendency from the dataset 110A, the "median" may be chosen as the statistical analysis tool, while to determine outliers from the dataset 110A, the "quartile" may be chosen as the statistical analysis tool.

At block 606, a first variable of the set of variables may be selected. The processor 204 may be configured to select a first variable of the set of variables related to the datapoints of the dataset 110A. Each of the set of variables may correspond to a feature of the dataset 110A. The first variable may correspond to a feature that may be selected from the set of variables for analysis of the dataset 110A. For example, a variable, such as, "household income" may be selected as the first variable from the features of the dataset 110A (e.g., a dataset including demographic information associated with people residing in a region). The selection of the first variable may be based on a user input from the user 116. In an alternate scenario, the first variable may be selected based on a certain predefined rule. For example, a variable of a numeric datatype may be selected as the first variable by the processor 204. In another example, a variable of Boolean datatype may be selected as the first variable by the processor 204. The selection of the first variable may be based on a type of statistical analysis that may be required to be performed on the dataset 110A. For example, a numerical variable may be selected as the first variable in case a correlation analysis is to be performed on the dataset 110A.

At block 608, the selected statistical analysis tool may be applied on a first set of datapoints related to the selected first variable. The processor 204 may be configured to apply the selected statistical analysis tool on the first set of datapoints related to the selected first variable. For example, the selected statistical tool may correspond to "median" and the first set of datapoints may correspond to "residents in a certain region who are employed in a government organization". The selected first variable may correspond to, for example, "household income" of the residents. Thus, in the current scenario, the processor 204 may apply a "median determination sub-routine" on the first variable "household income" for the first set of datapoints (i.e., records of government employees who reside in the region) to determine a median of the variable "household income".

At 610, statistical information related to the selected first variable may be determined, based on the application of the selected statistical analysis tool on the first set of datapoints. The processor 204 may be configured to determine the statistical information related to the selected first variable, based on the application of the selected statistical analysis tool on the first set of datapoints. For example, the statistical information determined by the processor 204 may include information such as, a median household income value of residents of the region who may be employed in a government organization.

At 612, a set of patterns associated with the first set of datapoints may be automatically determined, based on the determined statistical information related to the selected first variable. In an embodiment, the processor 204 may be configured to automatically determine the set of patterns (e.g., the set of patterns 316) associated with the first set of datapoints, based on the determined statistical information related to the selected first variable. For example, based on the statistical information related to government employees residing in a certain region, the processor 204 may determine patterns including information such as, a count of people whose household income value lies in a certain income range (such as, a high-income bracket), an income range associated with the greatest number of people, and so on.

In an embodiment, prior to the determination of the set of patterns, the processor 204 may determine whether the datapoints (e.g., the first set of datapoints) of the dataset 110A satisfy a predefined condition, based on the determined statistical information. For example, the statistical information may include information about a set of datapoints from the first set of datapoints that may correspond to outlier values of the selected first variable. In an embodiment, the outlier values may correspond to values in the top 1 percentile or bottom 1 percentile of the first set of datapoints. In such case, the predefined condition may correspond to 1 percentile. The processor 204 may compare a percentile rank associated with each value in the first set of datapoints to the predefined condition (e.g., a top or bottom 1 percentile rank) to determine such outlier values. The set of patterns may be determined for datapoints associated with such outlier values. Details related to threshold comparison are described, for example, in FIG. 3 (at 306). The determination of the set of patterns is described further, for example, in FIGS. 8, 9, 10, 11, 12, 15, 16, and 17.

At 614, a first set of predefined templates associated with the determined set of patterns may be retrieved. In an embodiment, the processor 204 may be configured to retrieve the first set of predefined templates (e.g., the first set of predefined templates 318) associated with the determined set of patterns 316. In an embodiment, the first set of predefined templates 318 may be stored in the database 104. The processor 204 may transmit a query including information associated with the determined set of patterns 316 to the database 104. The database 104 may retrieve the first set of predefined templates 318, based on the receipt of such query from the electronic device 102 and may send the retrieved first set of predefined templates 318 to the electronic device 102. The processor 204 may store the received the first set of predefined templates 318 in the memory 206. In another scenario, the first set of predefined templates 318 may be pre-stored in the memory 206. Based on the determined set of patterns 316, the processor 204 may retrieve the first set of predefined templates 318 from the memory 206. In another example, the first set of predefined templates 318 may be determined manually based on a user input, or determined automatically by use of the natural language model 114 (such as, a BERT model, a GPT-3 model, a GPT-2 model, an "XLNet" model, a ROBERTa model, or an ALBERT model). In an example, the first set of predefined templates 318 may include a predefined text (such as, "Information related to high-income households:") associated with a certain pattern (e.g., the count of people whose household income value lies in a high-income bracket). Examples of the first set of predefined templates are described further, for example, in FIGS. 8, 9, 10, 11, 12, 15, 16, and 17.

At block 616, a natural language model may be applied on the retrieved first set of predefined templates and on the determined statistical information. In an embodiment, the processor 204 may be configured to apply the natural language model (e.g., the natural language model 114) on the retrieved first set of predefined templates 318 and on the determined statistical information. For example, the processor 204 may apply a Bi-directional Encoder Representations from Transformers (BERT)-based language model on a predefined template, as described further, for example, at block 618.

At block 618, a first textual explanation of the determined set of patterns may be automatically determined, based on the application of the natural language model on the retrieved first set of predefined templates and on the determined statistical information. In an embodiment, the processor 204 may be configured to automatically determine the first textual explanation (e.g., the first textual explanation 320) of the determined set of patterns 316, based on the application of the natural language model 114 on the retrieved first set of predefined templates 318 and on the determined statistical information. For example, the processor 204 may apply the (BERT)-based language model on a predefined template, such as, "Information related to high-income households:" and on the determined statistical information (such as, top 10-percentile household incomes). Based on the application of the BERT-based language model, the processor 204 may determine the first textual explanation 320 such as, "There are 'N' number of government employees who reside in region 'X' and have a household income in a top income bracket of top-10 percentile in the region. The median household income of the 'N' government employees is USD 'Y'". The determination of the first textual explanation is described further, for example, in FIGS. 8, 9, 10, 11, 12, 14, 15, 16, and 17.

At block 620, a display device may be controlled to render the determined first textual explanation. The processor 204 may be configured to control a display device (e.g., the display device 206A of the electronic device 102 of FIG. 2) to render the determined first textual explanation 320. The processor 204 may render the first textual explanation 320 on the display device 208A for the user 116. The first textual explanation 320 may be a natural language easy-to-understand text that may explain the set of patterns 316 that may be determined from the first set of datapoints related to the first variable associated with the dataset 110A. Control may pass to end.

Although the flowchart 600 is illustrated as discrete operations, such as 602, 604, 606, 608, 610, 612, 614, 616, 618, and 620. However, in certain embodiments, such discrete operations may be further divided into additional operations, combined into fewer operations, or eliminated, depending on the particular implementation without detracting from the essence of the disclosed embodiments.

Figure 7:
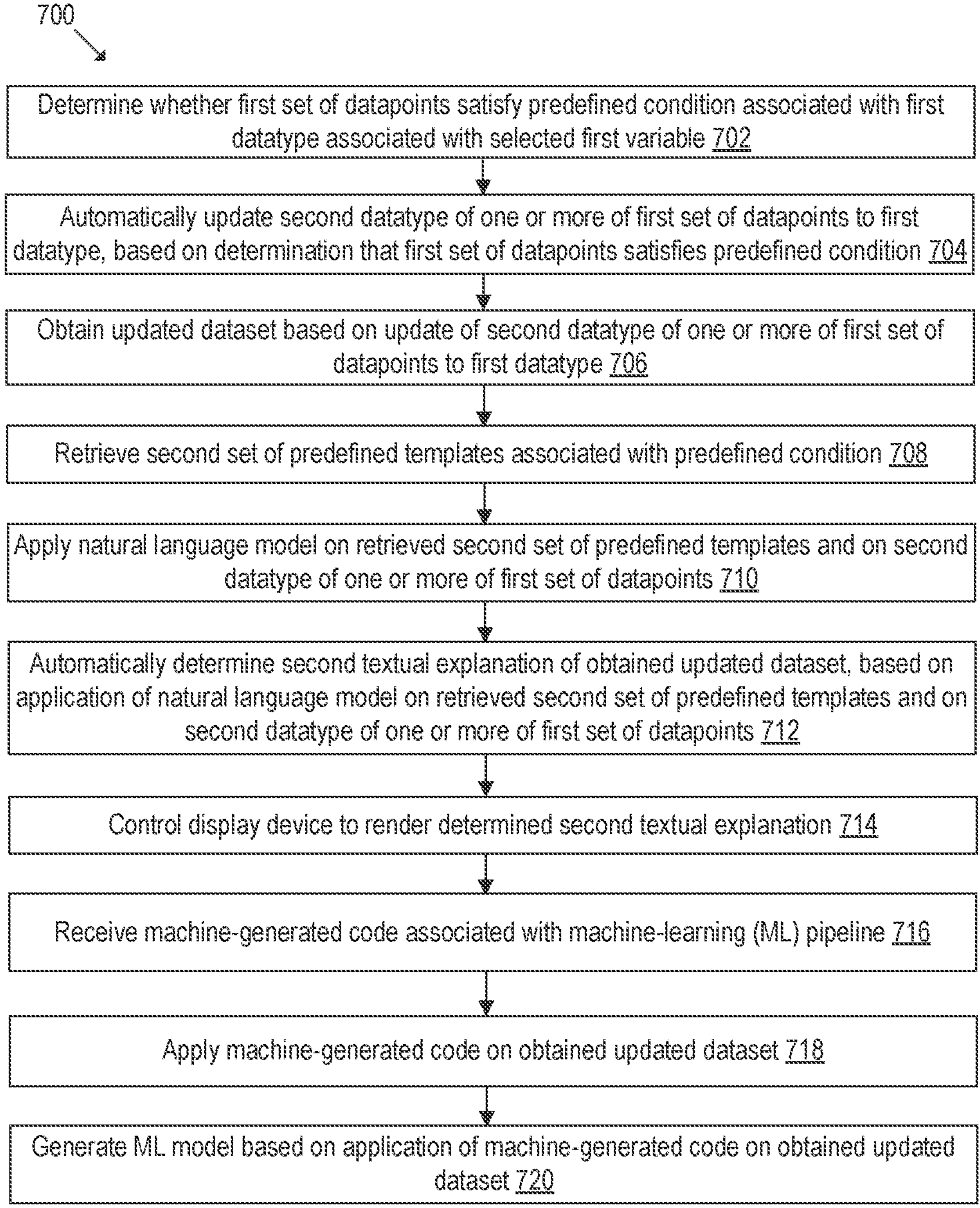
FIG. 7 is a diagram that illustrates a flowchart of an example method for automated dataset revision, textual explanation generation, and machine learning model generation.

FIG. 7 is a diagram that illustrates a flowchart of an example method for automated dataset revision, textual explanation generation, and machine learning model generation, in accordance with an embodiment of the disclosure. FIG. 7 is described in conjunction with elements from FIG. 1, FIG. 2, FIG. 3, FIG. 4, FIG. 5, and FIG. 6. With reference to FIG. 7, there is shown a flowchart 700. The method illustrated in the flowchart 700 may start at 702 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a check may be performed to determine whether a first set of datapoints satisfy a predefined condition associated with a first datatype associated with the selected first variable. In an embodiment, the processor 204 may be configured to determine whether datapoints (e.g., the first set of datapoints) of the dataset 110A satisfy a predefined condition. The predefined condition may be associated with a first datatype associated with the selected first variable. For example, the processor 204 may determine whether a datatype of the first set of datapoints corresponds to the first datatype (such as, a numeric datatype). In an embodiment, the processor 204 may determine that the first set of datapoints satisfy the predefined condition, in case a majority of datapoints correspond to the first datatype (e.g., a numeric datatype), and remaining datapoints belong to a second datatype (e.g., a Boolean datatype), such that the second datatype is convertible to the first datatype. For example, a Boolean datatype may be convertible to a numeric datatype. In case, the processor 204 determines that the first set of datapoints satisfies the predefined condition, the dataset 110A may be updated, as described further, for example, at 704 and 706.

At block 704, a second datatype of one or more of the first set of datapoints may be updated to the first datatype, based on the determination that the first set of datapoints satisfies the predefined condition. In an embodiment, the processor 204 may be configured to update a second datatype of one or more of the first set of datapoints to the first datatype, based on the determination that the first set of datapoints satisfies the predefined condition. For example, the first set of datapoints may correspond to a mixed data of an object datatype. The first set of datapoints may satisfy the predefined condition that a majority of datapoints may correspond to the first datatype (e.g., a numeric datatype), and remaining datapoints may correspond to a second datatype (e.g., a Boolean datatype), such that the second datatype may be converted to the first datatype. In case, the predefined condition is satisfied, the majority of the first set of datapoints may correspond to the first datatype and the second datatype of the remaining of the first set of datapoints may be convertible to the first datatype. The processor 204 may identify the remaining of the first set of datapoints that belong to the second datatype. The processor 204 may convert the second datatype of the remaining datapoints to the first datatype, as described, for example, at block 706.

At block 706, an updated dataset may be obtained based on the update of the second datatype of the one or more of the first set of datapoints to the first datatype. In an embodiment, the processor 204 may be configured to obtain an updated dataset (e.g., an updated dataset 414) based on the update of the second datatype of the one or more of the first set of datapoints to the first datatype. For example, the processor 204 may determine that a majority of datapoints related to a variable are of a numeric datatype. Further, the processor 204 may determine that the remaining datapoints related to the variable are of a Boolean datatype. In such case, as the Boolean datatype may be compatible with the numeric datatype, the processor 204 may update the datatype of the remaining (one or more) datapoints of the variable from a Boolean datatype to a numeric datapoint with corresponding numeric values. For example, a Boolean value of "True" or "Yes" may be converted to a numeric value of "1" and a Boolean value of "False" or "No" may be converted to a numeric value of "0" or "−1". Thus, based on the conversion of the datatype of the remaining (one or more) of the first set of datapoints from the second datatype to the first datatype, the processor 204 may update the values of the selected first variable in the dataset 110A and obtain the updated dataset 414. The dataset update is described further, for example, in FIG. 13.

At block 708, a second set of predefined templates associated with a predefined condition may be retrieved. In an embodiment, the processor 204 may be configured to retrieve a second set of predefined templates (e.g., a second set of predefined templates 416) associated with the predefined condition. In an embodiment, the second set of predefined templates 416 may be stored in the database 104. The processor 204 may transmit a query including information associated with the predefined condition to the database 104. The database 104 may retrieve the second set of predefined templates 416, based on the receipt of such query from the electronic device 102 and may send the retrieved second set of predefined templates 416 to the electronic device 102. The processor 204 may store the received the second set of predefined templates 416 in the memory 206. In another scenario, the second set of predefined templates 416 may be pre-stored in the memory 206. Based on the predefined condition, the processor 204 may retrieve the second set of predefined templates 416 from the memory 206. In another example, the second set of predefined templates 416 may be determined manually based on a user input, or determined automatically by use of the natural language model 114 (such as, a BERT model, a GPT-3 model, a GPT-2 model, an "XLNet" model, a ROBERTa model, or an ALBERT model). In an example, the second set of predefined templates 416 may include a predefined text (such as, "Inconsistent values for numeric type variable") associated with the predefined condition associated with the first datatype (e.g., a numeric datatype). Examples of the second set of predefined templates are described further, for example, in FIG. 14.

At block 710, a natural language model may be applied on the retrieved second set of predefined templates and the second datatype of the one or more of the first set of datapoints. In an embodiment, the processor 204 may be configured to apply a natural language model (e.g., the natural language model 114) on the retrieved second set of predefined templates 416 and on the second datatype of the one or more of the first set of datapoints. For example, the processor 204 may apply a Bi-directional Encoder Representations from Transformers (BERT)-based language model on a predefined template, such as, "Inconsistent values for numeric type variable" and on the second datatype (such as, a Boolean datatype associated "M" number of datapoints out of a total of "N" datapoints of the variable).

At block 712, a second textual explanation of the obtained updated dataset may be determined, based on the application of the natural language model on the retrieved second set of predefined templates and on the second datatype of the one or more of the first set of datapoints. In an embodiment, the processor 204 may be configured to determine a second textual explanation (e.g., a second textual explanation 418) of the updated dataset 414, based on the application of the natural language model 114 on the retrieved second set of predefined templates 416 and on the second datatype. For example, as described in the aforementioned, the processor 204 may apply the BERT-based language model on a predefined template, such as, "Inconsistent values for numeric type variable" and on the second datatype (such as, a Boolean datatype associated "M" number of datapoints out of a total of "N" datapoints of the variable). Based on the application of the BERT-based language model, the processor 204 may determine the second textual explanation 418 such as, "Inconsistent values for numeric type variable! There are 'M' number of Boolean datapoints related to the variable "V", out of "N" total number of datapoints of the variable "V". As the Boolean datatype is convertible to the numeric datatype, the values of the variable "V" can be made consistent". The determination of the second textual explanation is described further, for example, in FIG. 14.

At block 714, a display device may be controlled to render the determined second textual explanation. The processor 204 may be configured to control a display device (e.g., the display device 206A of the electronic device 102 of FIG. 2) to render the determined second textual explanation 418. The processor 204 may render the second textual explanation 418 on the display device 208A for the user 116. The second textual explanation 418 may be a natural language easy-to-understand text that may explain the revisions (e.g., datatype conversions) in the updated dataset 414.

In an embodiment, based on the updated dataset 414, the processor 204 may generate a machine learning model. In certain scenarios, the generation of the machine learning model may be automated. In some cases, the generation of the machine learning model may be based user inputs that may be received from the user 116, based on the displayed second textual explanation 418. For example, based on the displayed second textual explanation 418, the user 116 may understand reasons behind the update of the dataset 110A. The user 116 may provide certain user inputs, for example, instructions to edit a machine-generated code, edit a human-generated code or revise certain datapoints or variables of the updated dataset 414. Based on such user inputs, the machine learning model may be generated. The generation of the machine learning model is described next herein, at blocks 716, 718, and 720.

At block 716, a machine-generated code associated with a machine-learning (ML) pipeline may be received. In an embodiment, the processor 204 may be configured to receive the machine-generated code 508 associated with a machine-learning (ML) pipeline. In an embodiment, the machine-generated code 508 may be generated using various techniques such as, an ML-based technique to generate code, an AutoML technique or a SapientML technique. The processor 204 may store the received machine-generated code 508 in the memory 206.

At block 718, the received machine-generated code may be applied on the obtained updated dataset. In an embodiment, the processor 204 may be configured to apply the received machine-generated code 508 on the obtained updated dataset (e.g., the updated dataset 414). The update of the dataset 110A to obtain the updated dataset 414 is described further, for example, in FIG. 4 (at 406). The processor 204 may apply the received machine-generated code 508 on the obtained updated dataset 414, by plugging-in the updated dataset 414 as an input to the received machine-generated code 508. The machine-generated code 508 may execute on the obtained updated dataset 414 to produce an output.

At block 720, an ML model may be generated based on the application of the received machine-generated code on the obtained updated dataset. In an embodiment, the processor 204 may be configured to generate the ML model 510 based on the application of the received machine-generated code 508 on the obtained updated dataset 414. The ML model 510 may correspond to a higher dimensional space (i.e., a hyperspace or a hyperplane), which may be associated with a predefined non-linear decision boundary associated with a pre-trained ML model and an input dataset. The predefined non-linear decision boundary may be determined based on the application of the pre-trained ML model (which may correspond to the received machine-generated code 508) on the input dataset (e.g., the updated dataset 414). The ML model 510 may reduce complexity and time associated with classification or regression tasks corresponding to the pre-trained ML model. Control may pass to end.

Although the flowchart 700 is illustrated as discrete operations, such as 702, 704, 706, 708, 710, 712, 714, 716, 718, and 720. However, in certain embodiments, such discrete operations may be further divided into additional operations, combined into fewer operations, or eliminated, depending on the particular implementation without detracting from the essence of the disclosed embodiments.

Figures 8, 9:
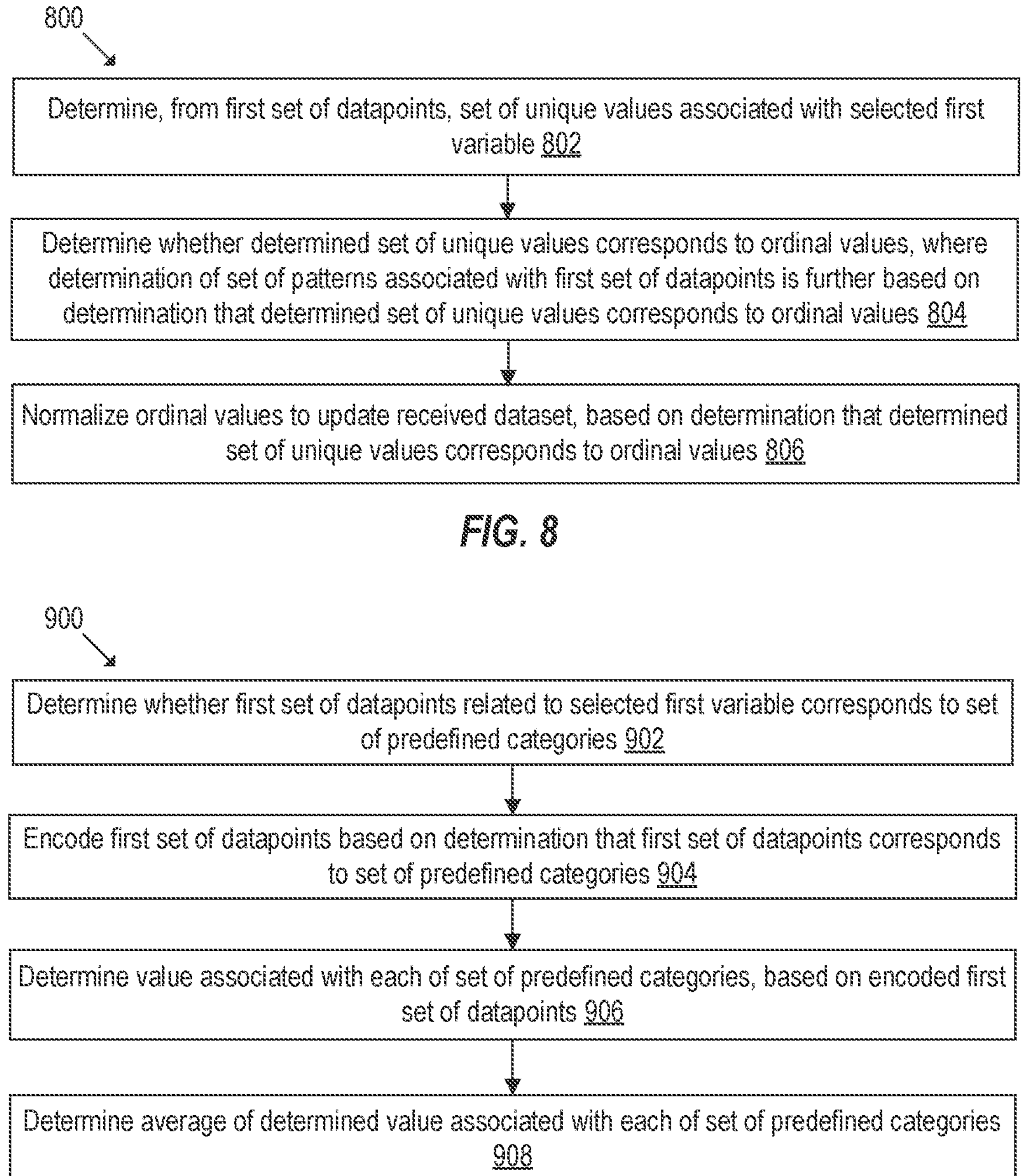
FIG. 8 is a diagram that illustrates a flowchart of an example method for ordinal encoding of categorical variables and generation of associated textual explanation.
FIG. 9 is a diagram that illustrates a flowchart of an example method for identification of outlier values of a categorical variable and generation of associated textual explanation.

FIG. 8 is a diagram that illustrates a flowchart of an example method for ordinal encoding of categorical variables and generation of associated textual explanation, in accordance with an embodiment of the disclosure. FIG. 8 is described in conjunction with elements from FIG. 1, FIG. 2, FIG. 3, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, a set of unique values associated with the selected first variable may be determined from the first set of datapoints. In an embodiment, the processor 204 may be configured to determine, from the first set of datapoints (of the dataset 110A), a set of unique values associated with the selected first variable. For example, in case the selected first variable corresponds to a date field that includes months associated with dates, the set of unique values may include strings such as, "January", "February", "March", . . . "December".

At block 804, it may be determined whether the determined set of unique values corresponds to ordinal values, wherein the determination of the set of patterns associated with the first set of datapoints may be further based on the determination that the determined set of unique values corresponds to the ordinal values. In an embodiment, the processor 204 may be configured to determine whether the determined set of unique values corresponds to ordinal values. In an embodiment, the processor 204 may apply at least one of, but not limited to, a BERT-Sort technique or a heuristic-based technique, on the determined set of unique values. Thereafter, the processor 204 may check for ordinal patterns associated with the set of unique values to determine whether the determined set of unique values corresponds to ordinal values. In another embodiment, the processor 204 may apply a set of predefined rules on the set of unique values to determine whether the determined set of unique values correspond to ordinal values. In an example, the set or predefined rules may correspond to user-defined rules that may indicate how to interpret values of a certain type, e.g., dates, levels of severity (e.g., high, medium, low), and the like.

In an embodiment, the determination of the set of patterns associated with the first set of datapoints may be further based on the determination that the determined set of unique values corresponds to the ordinal values. For example, based on the determination that set of unique values (such as, "January", "February", . . . "December") of a date-type variable corresponds to ordinal values, the processor 204 may determine a set of patterns. The set of patterns may include information that may indicate that the date-type variable includes "months of a year", which may have an inherent temporal ordering such that "January"<"February"<"March"< . . . <"December". The processor 204 may be configured to determine a textual explanation based on such set of patterns. For example, the determined textual explanation may indicate that "The variable "V" is an ordinal variable of date-type including string values, such as, months of a year!".

At block 806, the ordinal values may be normalized to update the received dataset, based on the determination that the determined set of unique values corresponds to the ordinal values. In an embodiment, the processor 204 may be configured to normalize the ordinal values to update the received dataset (e.g., the dataset 110A), based on the determination that the determined set of unique values corresponds to the ordinal values. For example, based on the determination that set of unique values (such as, "January", "February", . . . "December") of a date-type variable corresponds to ordinal values, the processor 204 may normalize the data-type variable to a numeric datatype with corresponding ordinal values. In an example, the processor 204 may replace "January" values of the variable with the integer value of "1", "February" values with the integer value of "2", and so on. Similarly, "December" may be assigned the integer value of "12". Thus, the set of unique values may be encoded to a numeric type. Control may pass to end.

Although the flowchart 800 is illustrated as discrete operations, such as 802, 804, and 806. However, in certain embodiments, such discrete operations may be further divided into additional operations, combined into fewer operations, or eliminated, depending on the particular implementation without detracting from the essence of the disclosed embodiments.

FIG. 9 is a diagram that illustrates a flowchart of an example method for identification of outlier values of a categorical variable and generation of associated textual explanation, in accordance with an embodiment of the disclosure. FIG. 9 is described in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The method illustrated in the flowchart 900 may start at 902 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, it may be determined whether the first set of datapoints related to the selected first variable corresponds to a set of predefined categories. In an embodiment, the processor 204 may be configured to determine whether the first set of datapoints related to the selected first variable corresponds to a set of predefined categories. In an embodiment, the set of predefined categories may correspond to a set of non-ordinal or nominal categories. For example, the set of predefined categories may include a set of SapientML categories or a set of cell categories.

At block 904, the first set of datapoints may be encoded based on the determination that the first set of datapoints corresponds to the set of predefined categories. In an embodiment, the first set of datapoints may be encoded based on the determination that the first set of datapoints corresponds to the set of predefined categories. For example, the processor 204 may retrieve a predefined value associated with each of the set of predefined categories from the memory 206 or from the database 104. Thereafter, the processor 204 may encode the first set of datapoints based on retrieved predefined values. In such case, the set of predefined categories may correspond to the set of SapientML categories.

In another example, the processor 204 may encode categorical values of the set of cell categories in the dataset 110A by sorting the categorical values based on a number of occurrences of each such value in the dataset 110A. The categorical values of the set of cell categories may be unordered values of a variable that may not have a defined order. Based on the sorting, the processor 204 may normalize such categorical values. For example, the sorted categorical values for a variable "type of job" may include "blue-collar" (e.g., 30% of all values), "management" (e.g., 20% of all values), "technician" (e.g., 13% of all values), "admin" (e.g., 12% of all values), "retired" (e.g., 10% of all values), "student" (e.g., 8% of all values), and "others" (e.g., 7% of all values). The processor 204 may normalize values the sorted categorical values for the variable "type of job" based on assignment of integer values, such as, "1", "2", "3", "4", "5", "6", and "7", respectively. In an embodiment, the processor 204 may store information associated with the encoding/normalization of the set of cell categories in the memory 206 or the database 104. For example, the information associated with the encoding/normalization may include the integer values assigned to each of the sorted categorical values for the variable.

At block 906, a value associated with each of the set of predefined categories may be determined, based on the encoded the first set of datapoints. In an embodiment, the processor 204 may determine the value associated with each of the set of predefined categories, based on the encoded first set of datapoints. For example, in case of the SapientML categories, the processor 204 may retrieve the value associated with each of the set of predefined categories from the memory 206 or the database 104. Similarly, in case of the cell categories, the processor 204 may retrieve the information associated with the encoding/normalization of each cell category from the memory 206 or the database 104. The information associated with the encoding/normalization may include the integer values assigned to each of the sorted categorical values for the variable.

At block 908, an average of the determined value associated with each of the set of predefined categories may be determined. In an embodiment, the processor 204 may be configured to determine an average of the determined value associated with each of the set of predefined categories. For example, in case of the cell categories with values, such as, "1", "2", . . . "7", the processor 204 may determine the average value as "4" (i.e., (1+2+3+ . . . 7)/7=28/7=4).

At block 910, an outlier category may be identified from the set of predefined categories, based on the determined average, wherein the determination of the set of patterns associated with the first set of datapoints may be further based on the identification of the outlier category. In an embodiment, the processor 204 may be configured to identify the outlier category from the set of predefined categories, based on the determined average. For example, the processor 204 may determine a standard deviation of the determined values associated with the set of predefined categories, based on the average value. In case of the cell categories with values, such as, "1", "2", . . . "7", with the average value of "4", the standard deviation may be determined as "2". In an example, the processor 204 may identify a category as an outlier category in case the value associated with the category is beyond one standard deviation from the average value. In such case, categories with values beyond "4+2" (i.e., less than "2" or greater than "6") may correspond to outlier categories. Thus, the categories "1" (i.e., the category with the minimum value) and "7" (i.e., the category with the maximum value) may correspond to the outlier categories.

In an embodiment, the determination of the set of patterns associated with the first set of datapoints may be further based on the identification of the outlier category. For example, based on the identification of the outlier category, the processor 204 may identify corresponding datapoints that may correspond to outliers, which be required to be inspected. The processor 204 may determine a set of patterns associated with the identified outlier category and the identified corresponding datapoints. In an example, the set of patterns may include summary data associated with such identified datapoints, including, for example, statistical values of other variables associated with such datapoints. The processor 204 may be configured to determine a textual explanation based on such set of patterns. For example, the determined textual explanation may indicate that "The category "C1" is an outlier category with the least number of datapoints. It includes "N1" datapoints of the total "N" datapoints in the dataset. Average value, minimum value, and maximum value of variable "V" for the datapoints in this category are "x", "y", and "z". Control may pass to end.

Although the flowchart 900 is illustrated as discrete operations, such as 902, 904, 906, 908, and 910. However, in certain embodiments, such discrete operations may be further divided into additional operations, combined into fewer operations, or eliminated, depending on the particular implementation without detracting from the essence of the disclosed embodiments.

FIG. 10 is a diagram that illustrates a flowchart of an example method for application of a transformation function on a variable of a dataset and generation of associated textual explanation, in accordance with an embodiment of the disclosure. FIG. 10 is described in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000. The method illustrated in the flowchart 1000 may start at 1002 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1000 may be divided into additional blocks, combined into fewer blocks, or eliminated, depending on the particular implementation.

At block 1002, a transformation function may be applied on the first set of datapoints. In an embodiment, the processor 204 may be configured to apply the transformation function on the first set of datapoints. The transformation function may be applied on the first set of datapoints to normalize values of the first variable in the first set of datapoints. For example, based on the normalization of the values, a graphical plot associated with the first variable may become more symmetrical about a mean value or may become a normal distribution. In other words, a skewness of the first variable may become closer to zero based on the transform. Examples of the transformation function may include a logarithmic function, a box cox function, or a square root function. The logarithmic function may be useful in a scenario where the first variable lies in a large range of values (e.g., between 1 to 1,000,000). In case of the logarithmic function, the first set of datapoints may be required to have non-zero values. To handle zero values, the logarithmic function may not be applied on the zero valued datapoints, while a default value of "0" may be assigned to the transformation function for such datapoints. In case of the box cox function, the first set of datapoints may be required to have positive values. To handle negative values, the box cox function may not be applied on negative values and a default value of "0" may be assigned to the transformation function in case the value of the first variable is "0".

At block 1004, the first set of datapoints may be transformed to obtain an updated dataset, based on the application of the transformation function on the first set of datapoints, wherein the determination of the set of patterns associated with the first set of datapoints may be further based on the transformation of the first set of datapoints. In an embodiment, the processor 204 may be configured to transform the first set of datapoints to obtain an updated dataset, based on the application of the transformation function on the first set of datapoints. For example, the logarithm function may be applied to all non-zero values of the first variable and a default value of "O" may be assigned to "0" values of the first variable for the transformation of the first variable. The transformed datapoints may correspond to the updated dataset.

In an embodiment, the determination of the set of patterns associated with the first set of datapoints may be further based on the transformation of the first set of datapoints. For example, based on the transformation of the first set of datapoints, the processor 204 may determine statistics associated with the transformed first set of datapoints. The processor 204 may determine a set of patterns associated with the determined statistics associated with the transformed first set of datapoints. In an example, the set of patterns may include summary data associated with, for example, the range of the transformed values and a type of distribution of the transformed values. The processor 204 may be configured to determine a textual explanation based on such set of patterns. For example, the determined textual explanation may indicate that "The transformed data of the variable "V" ranges from "n1" to "n2", is symmetric about a value "n3", and follows a normal distribution with mean "u" and standard deviation "sd"!". Control may pass to end.

Although the flowchart 1000 is illustrated as discrete operations, such as 1002 and 1004. However, in certain embodiments, such discrete operations may be further divided into additional operations, combined into fewer operations, or eliminated, depending on the particular implementation without detracting from the essence of the disclosed embodiments.

FIG. 11 is a diagram that illustrates a flowchart of an example method for determination of skewness of datapoints of a variable and generation of associated textual explanation, in accordance with an embodiment of the disclosure. FIG. 11 is described in conjunction with elements from FIG. 1, FIG. 2, FIG. 3, FIG. 4, FIG. 5, FIG. 6, FIG. 7, FIG. 8, FIG. 9, and FIG. 10. With reference to FIG. 11, there is shown a flowchart 1100. The method illustrated in the flowchart 1100 may start at 1102 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1100 may be divided into additional blocks, combined into fewer blocks, or eliminated, depending on the particular implementation.

At block 1102, a skewness associated with the first set of datapoints may be determined. In an embodiment, the processor 204 may be configured to determine a skewness associated with the first set of datapoints associated with the selected first variable. Datapoints associated with a variable may be referred to as skewed based on a distortion of a statistical distribution curve of the datapoints to a left or a right side of a mean value of the variable, such that one of the tails of the curve may be longer than the other. The skewness may correspond to a measure of asymmetry of a distribution of data. If the skewness is close to zero, data be normally distributed and symmetric. In an embodiment, the processor 204 may determine the skewness based on a Pearson's moment coefficient of skewness, based on following expression (1):

$$\tilde{\mu}_3 = E\left[\left(\frac{X-\mu}{\sigma}\right)^3\right] = \frac{\mu_3}{\sigma^3} = \frac{E\left[(X-\mu)^3\right]}{E\left[(X-\mu)^2\right]^{3/2}} = \frac{k_3}{k_2^{3/2}} \quad (1)$$

where, $\tilde{\mu}_3$ may represent the skewness (i.e., a normalized third central moment);

μ may represent a mean;

σ may represent a standard deviation;

E may represent an expectation operator;

$\mu_3$ may represent a third central moment; and $k_t$ may represent a t-th cumulant At block 1104, the determined skewness may be compared with a set of predefined thresholds, wherein the determination of the set of patterns associated with the first set of datapoints may be further based on the comparison of the determined skewness with the set of predefined thresholds. In an embodiment, the processor 204 may be configured to compare the determined skewness with a set of predefined thresholds. In an example, the set of predefined thresholds may be manually assigned values. In another example, the processor 204 may determine the set of predefined thresholds based on an average value associated with a skewness of a set of sample datasets. For example, the set of predefined thresholds may include values such as, −1, −0.5, 0, 0.5, and 1. In case, the determined skewness is between 0.5 and −0.5, a distribution of the first variable may be determines as a symmetric distribution. In another case, if the determined skewness is less than-1 or greater than 1, the distribution of the first variable may be determined as a highly skewed distribution. Further, in case the determined skewness is between −0.5 to −1 or between 0.5 to 1, the distribution of the first variable may be determined as a moderately skewed distribution.

In an embodiment, the determination of the set of patterns associated with the first set of datapoints may be further based on the comparison of the determined skewness with the set of predefined thresholds. For example, based on the comparison of the determined skewness with the set of predefined thresholds (such as, −1, −0.5, 0, 0.5, and 1), the processor 204 may determine a degree of skewness of the distribution of the first variable, as a determined set of patterns. The processor 204 may be configured to determine a textual explanation based on such set of patterns. For example, in case the distribution of the first variable is determined as symmetric based on the skewness, the determined textual explanation may indicate that "The variable "V" is a symmetric distribution about its mean "u", with a skewness value "x"". Herein, the skewness value "x" may be between −0.5 and 0.5. Similar textual explanations may be generated in case the first variable is highly skewed or moderately skewed. Control may pass to end.

Although the flowchart 1100 is illustrated as discrete operations, such as 1102 and 1104. However, in certain embodiments, such discrete operations may be further divided into additional operations, combined into fewer operations, or eliminated, depending on the particular implementation without detracting from the essence of the disclosed embodiments.

FIG. 12 is a diagram that illustrates a flowchart of an example method for determination of kurtosis of datapoints of a variable and generation of associated textual explanation, in accordance with an embodiment of the disclosure. FIG. 12 is described in conjunction with elements from FIG. 1, FIG. 2, FIG. 3, FIG. 4, FIG. 5, FIG. 6, FIG. 7, FIG. 8, FIG. 9, FIG. 10, and FIG. 11. With reference to FIG. 12, there is shown a flowchart 1200. The method illustrated in the flowchart 1200 may start at 1202 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1200 may be divided into additional blocks, combined into fewer blocks, or eliminated, depending on the particular implementation.

At block 1202, a kurtosis associated with the first set of datapoints may be determined. In an embodiment, the processor 204 may be configured to determine a kurtosis associated with the first set of datapoints. The kurtosis of a distribution of a variable may indicate a height and sharpness of a central peak of the distribution with respect to a normal distribution (i.e., a standard bell curve). In an embodiment, the processor 204 may determine the kurtosis based on following expression (2):

$$\tilde{\mu}_4 = \frac{\mu_4}{\sigma^4} \quad (2)$$

where, $\tilde{\mu}_4$ may represent the kurtosis (i.e., a normalized fourth central moment);

$\mu_4$ may represent a fourth central moment; and

σ may represent a standard deviation.

At block 1204, it may be determined whether the determined kurtosis corresponds to an abnormal value, wherein the determination of the set of patterns associated with the first set of datapoints may be further based on the determined kurtosis and on the determination that the determined kurtosis corresponds to the abnormal value. In an embodiment, the processor 204 may be configured to determine whether the determined kurtosis corresponds to an abnormal value. In an example, the abnormal value may correspond to a set of predefined thresholds that may be manually assigned values. In another example, the processor 204 may determine the set of predefined thresholds based on an average value associated with a kurtosis of a set of sample datasets. For example, the abnormal value may correspond a kurtosis value of greater than 3 (i.e., a leptokurtic distribution) or a kurtosis value of less than 3 (i.e., a platykurtic distribution). In case the distribution of the first variable is a leptokurtic distribution, the distribution may be fat-tailed and may have a high outlier datapoint frequency as compared to the rest of the datapoints of the first variable. In case the distribution of the first variable is a platykurtic distribution, the distribution may be thin-tailed and may have a low outlier datapoint frequency as compared to the rest of the datapoints of the first variable. Further, if the kurtosis value is approximately 3, the distribution of the first variable may correspond to a mesokurtic distribution with a medium outlier frequency as compared to the rest of the datapoints of the first variable. In such case, the distribution of the first variable may correspond to a normal distribution. Thus, the abnormal value of the kurtosis may correspond to values greater than 3 or values less than 3.

In an embodiment, the determination of the set of patterns associated with the first set of datapoints may be further based on the determined kurtosis and on the determination that the determined kurtosis corresponds to the abnormal value. For example, based on the determination kurtosis and the determination that the determined kurtosis is abnormal (e.g., less than 3 or greater than 3), the processor 204 may determine a type of distribution, and a height and sharpness of peaks of the distribution, as a determined set of patterns. The processor 204 may be configured to determine a textual explanation based on such set of patterns. For example, in case the kurtosis is greater than 3, the determined textual explanation may indicate that "The distribution of the variable "V" is a leptokurtic distribution, which is fat-tailed and has a high outlier datapoint frequency, with a kurtosis value "x". Herein, the kurtosis value "x" may be between greater than 3. Similar textual explanations may be generated in case kurtosis of the first variable is less than 3. Control may pass to end.

Although the flowchart 1200 is illustrated as discrete operations, such as 1202 and 1204. However, in certain embodiments, such discrete operations may be further divided into additional operations, combined into fewer operations, or eliminated, depending on the particular implementation without detracting from the essence of the disclosed embodiments.

FIG. 13 is a diagram that illustrates a flowchart of an example method for automated datatype consistency check and automated dataset revision for inconsistent data, in accordance with an embodiment of the disclosure. FIG. 13 is described in conjunction with elements from FIG. 1, FIG. 2, FIG. 3, FIG. 4, FIG. 5, FIG. 6, FIG. 7, FIG. 8, FIG. 9, FIG. 10, FIG. 11, and FIG. 12. With reference to FIG. 13, there is shown a flowchart 1300. The method illustrated in the flowchart 1300 may start at 1302 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1300 may be divided into additional blocks, combined into fewer blocks, or eliminated, depending on the particular implementation.

At block 1302, it may be determined whether a datatype of the selected first variable corresponds to an object type, wherein the datatype of the selected first variable may correspond to one of a string datatype, an integer datatype, a floating-point datatype, a mixed datatype of a string and an integer, a mixed datatype of a string and a floating-point, or a mixed datatype of an integer and a floating-point. In an embodiment, the processor 204 may be configured to determine whether a datatype of the selected first variable corresponds to an object type. The datatype of the selected first variable may correspond to one of a string datatype, an integer datatype, a floating-point datatype, a mixed datatype of a string and an integer, a mixed datatype of a string and a floating-point, or a mixed datatype of an integer and a floating-point. For example, the processor 204 may use an in-built library function (such as, a "type( )" function) in "Python" programming language to determine whether the datatype of the selected first variable corresponds to an object type. An object type variable may correspond to a variable of a mixed datatype with one or more contexts. The processor 204 may further use a feature of a "pandas" library of "Python" programming language to determine the context of the datatype of the selected first variable of the object datatype.

At block 1304, it may be determined whether the datatype corresponds to a string datatype or a numeric datatype, based on the determination that the datatype corresponds to the object type. In an embodiment, the processor 204 may be configured to determine whether the datatype corresponds to a string datatype or a numeric datatype, based on the determination that the datatype corresponds to the object type. For example, the processor 204 may use in-built library functions (such as, an "isalpha( )" function or an "isalnum( )" function) in "Python" programming language to determine whether the datatype of a datapoint of the first set of datapoints of the selected first variable corresponds to a string datatype. Further, the processor 204 may use in-built library functions (such as, an "isnum( )" function, an "isdigit( )" function, or an "isdecimal( )" function) in "Python" programming language to determine whether the datatype of a datapoint of the first set of datapoints of the selected first variable corresponds to a numeric datatype.

At block 1306, it may be determined whether the datatype corresponds to a Boolean string datatype, based on the determination that the datatype corresponds to the string datatype. In an embodiment, the processor 204 may be configured to determine whether the datatype corresponds to a Boolean string datatype, based on the determination that the datatype corresponds to the string type. For example, the processor 204 may use determine whether a datapoint of the first set of datapoints corresponds to the Boolean string datatype, based on whether the string value of the datapoint corresponds to a set of predefined string values associated with Boolean strings. Examples of the set of predefined string values associated with Boolean strings may include, but is not limited to, "True", "False", "Yes", "No", "Accept", and "Reject".

In another embodiment, the processor 204 may use the natural language model 114 to determine a sentence embedding or word embedding associated with the string value of the datapoint. For example, the processor 204 may use a "SentenceTransformer" sentence embedding tool of "Python" programming language to determine the sentence embedding or the word embedding of values of the first set of datapoints. Thereafter, the processor 204 may determine vector distances or similarity scores between the sentence or word embeddings of the first set of datapoints, based on a Euclidean distance or a cosine distance similarity measure. All datapoints with a high similarity score (i.e., a similarity score of close to "1") or high contextual similarity with respect to each other may be assigned a certain character, say "A". All other datapoints may be assigned another character, such as, "B".

At block 1308, the first set of datapoints may be mapped from the Boolean string datatype to the numeric datatype. In an embodiment, the processor 204 may be configured to map the first set of datapoints from the Boolean string datatype to the numeric datatype. For example, the processor 204 may map Boolean strings, such as, "True", "Yes", or "Accept" to a numeric integer value, such as, "1". Further, the processor 204 may map the complementary Boolean strings, such as, "False", "No", or "Reject" to a numeric integer value, such as, "0" or "−1". In case of the aforementioned example of the use of "SentenceTransformer" for determination of the sentence or word embeddings of the first set of datapoints, the processor 204 may map the character "A" to "1" and the character "B" to "0" or "−1". Alternatively, the character "A" may be mapped to "0" or "−1" and the character "B" may be mapped to "1".

At block 1310, it may be determined whether the datatype corresponds to a floating-point numeric datatype or an integer numeric datatype, based on the determination that the datatype corresponds to the numeric datatype or based on the mapping. In an embodiment, the processor 204 may be configured to determine whether the datatype corresponds to a floating-point numeric datatype or an integer numeric datatype, based on the determination that the datatype corresponds to the numeric datatype or based on the mapping. The processor 204 may determine that the datatype of a datapoint of the first set of datapoint corresponds to a numeric datatype, as described, for example, at block 1304. Further, the processor 204 may determine whether the datatype of the datapoint is mapped to a numeric datatype, as described, for example, at block 1308. Based on the determination that the datapoint corresponds to a numeric datatype or the datatype of the datapoint has been updated to a numeric datatype due to the mapping, the processor 204 may determine whether the numeric datatype of the datapoint is a floating-point numeric datapoint or an integer numeric datapoint, as described next herein. For example, the processor 204 may use in-built library functions (such as, an "isdecimal( )" function) in "Python" programming language to determine whether the datatype of the datapoint of the first set of datapoints is a floating-point numeric datapoint. Further, the processor 204 may use in-built library functions (such as, an "isdigit( )" function) in "Python" programming language to determine whether the datatype of the datapoint of the first set of datapoints is an integer numeric datatype.

At block 1312, the datatype may be converted to the floating-point numeric datatype to obtain an updated dataset, based on the determination that the datatype corresponds to the floating-point numeric datatype or the integer numeric datatype. In an embodiment, the processor 204 may be configured to convert the datatype to the floating-point numeric datatype to obtain an updated dataset (e.g., the updated dataset 414), based on the determination that the datatype corresponds to the floating-point numeric datatype or the integer numeric datatype. In case, the datatype of a datapoint of the first set of datapoints is determined as the floating-point or integer numeric datatype, the processor 204 may convert the datatype of the first set of datapoints to the floating-point datatype. For example, the processor 204 may use an in-built library function (e.g., a "float( )" constructor function) of a programming language (such as, "Python" programing language) to convert the datatype of the first set of datapoints to the float-point datatype.

At block 1314, the datatype may be converted to the integer numeric datatype to obtain an updated dataset, based on the determination that the datatype does not correspond to the floating-point numeric datatype or the integer numeric datatype, wherein the determination of the set of patterns associated with the first set of datapoints may be further based on the obtained updated dataset. In an embodiment, the processor 204 may be configured to convert the datatype to the integer numeric datatype to obtain an updated dataset (e.g., the updated dataset 414), based on the determination that the datatype does not correspond to the floating-point numeric datatype or the integer numeric datatype. In case, the datatype of a datapoint of the first set of datapoints is determined different from the floating-point or integer numeric datatype, the processor 204 may convert the datatype of the first set of datapoints to the integer datatype. For example, the processor 204 may use an in-built library function (e.g., an "int( )" constructor function) of a programming language (such as, "Python" programing language) to convert the datatype of the first set of datapoints to the integer numeric datatype.

In an embodiment, the determination of the set of patterns associated with the first set of datapoints may be further based on the obtained updated dataset. The processor 204 may determine statistics associated with the datapoints that may be converted from the second datatype (e.g., a string datatype) to the first datatype (e.g., the integer numeric datatype). The set of patterns may be determined based on such determined statistics. The processor 204 may be configured to determine a textual explanation based on such set of patterns. For example, the determined textual explanation may indicate that "The variable "V" includes "N" values out of which "n" (a %) values are of string type, "m" (b % values) are of float type, and "k" (c % values) are of integer type. The values of the variable "V" are converted to a float type values". Control may pass to end.

Although the flowchart 1300 is illustrated as discrete operations, such as 1302, 1304, 1306, 1308, 1310, 1312, and 1314. However, in certain embodiments, such discrete operations may be further divided into additional operations, combined into fewer operations, or eliminated, depending on the particular implementation without detracting from the essence of the disclosed embodiments.

Figure 14:
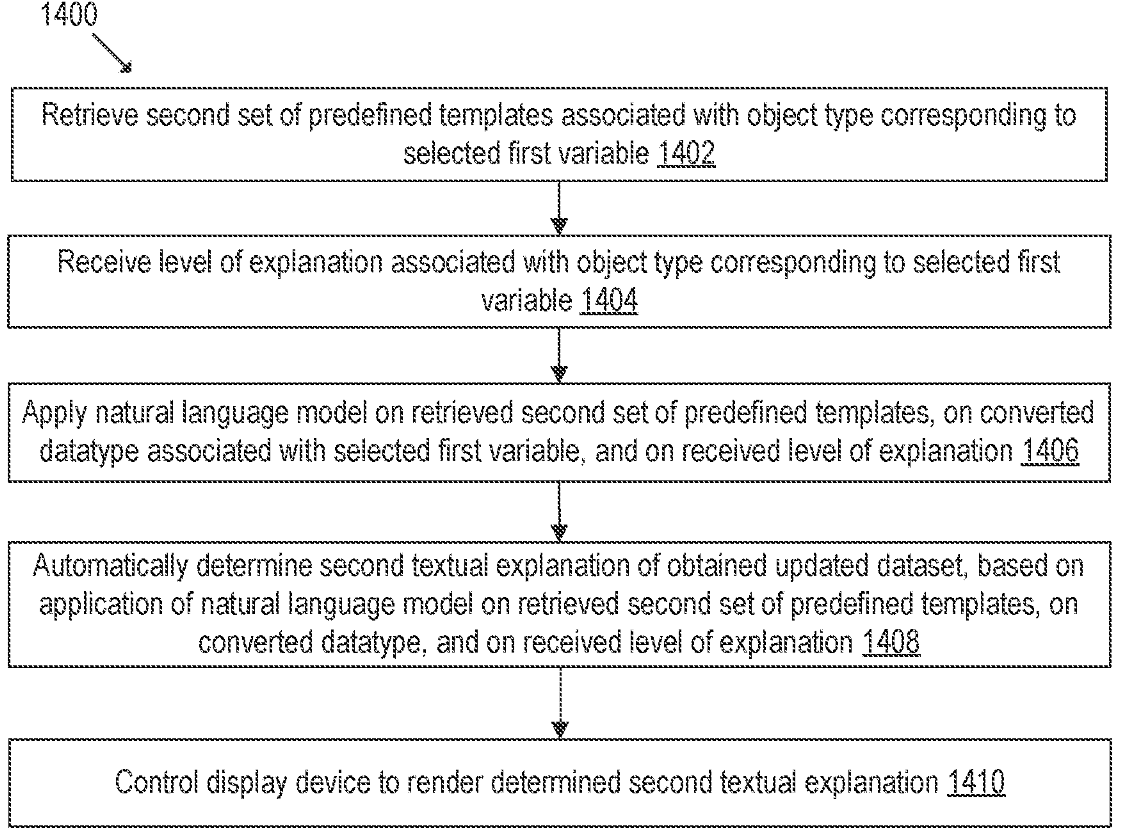
FIG. 14 is a diagram that illustrates a flowchart of an example method for generation of textual explanation of automated datatype consistency check and automated dataset revision for inconsistent data.

FIG. 14 is a diagram that illustrates a flowchart of an example method for generation of textual explanation of automated datatype consistency check and automated dataset revision for inconsistent data, in accordance with an embodiment of the disclosure. FIG. 14 is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13. With reference to FIG. 14, there is shown a flowchart 1400. The method illustrated in the flowchart 1400 may start at 1402 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1400 may be divided into additional blocks, combined into fewer blocks, or eliminated, depending on the particular implementation.

At block 1402, a second set of predefined templates associated with the object type corresponding to the selected first variable may be retrieved. In an embodiment, the processor 204 may be configured to retrieve a second set of predefined templates (e.g., the second set of predefined templates 416) associated with the object type corresponding to the selected first variable. In an embodiment, the second set of predefined templates 416 may be stored in the database 104. The processor 204 may transmit a query including information associated with the predefined condition associated with the object datatype (i.e., the object datatype of the first set of datapoints) to the database 104. The database 104 may retrieve the second set of predefined templates 416, based on the receipt of such query from the electronic device 102 and may send the retrieved second set of predefined templates 416 to the electronic device 102. The processor 204 may store the received the second set of predefined templates 416 in the memory 206. In another scenario, the second set of predefined templates 416 may be pre-stored in the memory 206. Based on the predefined condition and/or the object datatype, the processor 204 may retrieve the second set of predefined templates 416 from the memory 206. In another example, the second set of predefined templates 416 may be determined manually based on a user input, or determined automatically by use of the natural language model 114 (such as, a BERT model, a GPT-3 model, a GPT-2 model, an "XLNet" model, a RoBERTa model, or an ALBERT model). In an example, the second set of predefined templates 416 may include a predefined text (such as, "Inconsistent values for numeric type variable") associated with the predefined condition associated with the first datatype (e.g., a numeric datatype).

At block 1404, a level of explanation associated with the object type corresponding to the selected first variable may be received. In an embodiment, the processor 204 may be configured to receive a level of explanation associated with the object type corresponding to the selected first variable. The level of explanation may correspond to an amount of detail that may be required to be included in the second textual explanation. The higher the level of explanation, the higher may be the amount or degree of detail associated with the second textual explanation. In an embodiment, the level of explanation may be received as a user input from the user 116.

At block 1406, a natural language model may be applied on the retrieved second set of predefined templates, on the converted datatype associated with the selected first variable, and on the received level of explanation. In an embodiment, the processor 204 may be configured to apply the natural language model (e.g., the natural language model 114) on the retrieved second set of predefined templates 416, on the converted datatype associated with the selected first variable, and on the received level of explanation. For example, the processor 204 may apply a Bi-directional Encoder Representations from Transformers (BERT)-based language model on a predefined template (such as, "Inconsistent values for numeric type variable"), on the second datatype (such as, a Boolean datatype associated "M" number of datapoints out of a total of "N" datapoints of the variable), and the level of explanation (such as, a "level-2").

At block 1408, the second textual explanation of the obtained updated dataset may be automatically determined, based on the application of the natural language model on the retrieved second set of predefined templates, on the converted datatype, and on the received level of explanation. In an embodiment, the processor 204 may be configured to automatically determine the second textual explanation 418 of the obtained updated dataset 414, based on the application of the natural language model 114 on the retrieved second set of predefined templates 416, on the converted datatype, and on the received level of explanation. For example, the processor 204 may apply the BERT-based language model or transformer-based language model on a predefined template (such as, "Inconsistent values for numeric type variable"), on the second datatype (such as, a Boolean datatype associated "M" number of datapoints out of a total of "N" datapoints of the variable), and the level of explanation (such as, a "level-2"). Based on the application of the BERT-based language model, the processor 204 may determine the second textual explanation 418 such as, "Inconsistent values for numeric type variable! There are 'M' number of Boolean datapoints related to the variable "V", out of "N" total number of datapoints of the variable "V". There "2" distinct values of the Boolean datapoints including "Yes" and "No" and there are "x" unique values of the numeric datapoints. As the Boolean datatype is convertible to the numeric datatype, the values of the variable "V" can be made consistent".

In an example, the processor 204 may receive the following user input of three code lines in "Python" programming language for automated exploratory data analysis (EDA):

```
In[1]: eda=EDA(ds, log_level=2)
In[2]: eda.check_consistency(convert=False)
In[3]: print(eda)
```

Herein, "EDA( )" may be a function that may perform automated exploratory data analysis, as per the disclosure. Further, "ds" may correspond to an input dataset (e.g., the dataset 110A), and "log_level" may correspond to the level of explanation. The "check_consistency( )" function may be a function that may automatically determine whether the set of variables of the input dataset 110A are consistent. The parameter "convert" may be set to "False" to indicate that the inconsistent values are not required to be updated. Further, "print(eda)" function may display an output corresponding to a textual explanation (e.g., the first textual explanation) of the automated exploratory data analysis operation. For example, the following output may be generated as the first textual explanation, in the current case:

```
Out[4]:
#df['dependency'] includes string values of: no, yes where it is mixed with 29 different number of numeric values #df['edjefe'] includes string values of: no, yes where it is nixed with 20 different number Of numeric values.
#df['edjefa'] includes string values of: no, yes where it is mixed with 20 different number of numeric values.
```

In another example, the processor 204 may receive the following user input of three code lines in "Python" programming language for automated EDA:

```
In[1]: eda=EDA(ds, log_level=2)
In[2]: eda.check_consistency(convert=False)
In [3]: eda.description
```

In the current example, "EDA( )", "ds", "log_level", "check_consistency( )", and "convert" may be same as in the previous example. Herein, "eda.description" may correspond to the determined first textual explanation, which may be a human-readable explanation based on the consistency check of the input dataset (e.g., the dataset 110A) but without the revision of the inconsistent data. The output of the aforementioned code may be as follows:

```
Out[4]:
[(["df['dependency'] includes string values of: no, yes where is mixed with 29 different number of numeric values.", 'markdown'),
(["df['edjefe'] includes string values of: no, yes where is mixed with 20 different number of numeric values.", 'markdown'),
```

(["df['edjefa'] includes string values of: no, yes where is mixed with 20 different number of numeric values.", 'markdown')]

In another example, the processor 204 may receive the following user input of three code lines in "Python" programming language for automated EDA:

In[1]: eda=EDA(ds, log_level=1)

In[2]: eda.check_consistency(convert=True)

In [3]: print(eda)

In the current example, "EDA( )", "ds", and "check_consistency( )", may be same as in the previous example. Herein, "log_level" may be set to "1" to output details on a macro level (i.e., a "level-1" of the level of explanation). Further, the "convert" parameter may be set to "True", which may trigger an automatic revision of the datatype of the inconsistent data in the input dataset 110A to obtain the updated dataset 110A. The output of the aforementioned code may correspond to a textual explanation (e.g., the second textual explanation) as follows:

Out[4]:

#df['dependency'] includes string values of: no, yes where it is mixed with 29 different number of numeric values.

df['dependency']=df['dependency'].replace('no', str(0))

df['dependency']=df['dependency'].replace('yes', str(1))

df['dependency']=df['dependency'].astype(float) #df ['edjefe'] includes string values of: no, yes where it is mixed with 20 different number of numeric values.

df['edjefe']=df['edjefe'].replace('no', str(0))

df['edjefe']=df['edjefe'].replace('yes', str(1))

df['edjefe']=df['edjefe'].astype(int) #df['edjefa'] includes string values of: no, yes where it is mixed with 20 different number of numeric values.

df['edjefa']=df['edjefa'].replace('no', str(0))

df['edjefa']=df['edjefa'].replace('yes', str(1))

df['edjefa']=df['edjefa'].astype(int)

In another example, the processor 204 may receive the following user input of three code lines in "Python" programming language for automated EDA:

In[1]: eda=EDA(ds, log_level=2)

In[2]: eda.check_consistency(convert=True)

In[3]: print(eda)

In the current example, "EDA( )", "ds", and "check_consistency( )", may be same as in the previous example. Herein, "log_level" may be set to "2" to output details on a micro level (i.e., a "level-2" of the level of explanation). Further, the "convert" parameter may be set to "True", which may trigger an automatic revision of the datatype of the inconsistent data in the input dataset 110A to obtain the updated dataset 110A. Thus, a more detailed report of a data inconsistency issue and the resolution of the issue may be generated. The output of the aforementioned code may correspond to a textual explanation (e.g., the second textual explanation) as follows:

Out[4]:

#df['dependency'] includes string values of: no, yes where it is mixed with 29 different number of numeric values.

#We can replace 'no' with '0' df['dependency']=df['dependency'].replace('no', str(0)) #We can replace 'yes' with '1' df['dependency']=df['dependency'].replace('yes', str(1)) #Let's convert df['dependency'] from Object to float because it includes at least one float value.

df['dependency']=df['dependency'].astype(float) #df ['edjefe'] includes string values of: no, yes where it is mixed with 20 different number of numeric values.

#We can replace 'no' with '0' df['edjefe']=df['edjefe'].replace('no', str(0)) #We can replace 'yes' with '1' df['edjefe']=df['edjefe'].replace('yes', str(1)) #Let's convert df['edjefe'] from Object to integer.

df['edjefe']=df['edjefe'].astype(int) #df['edjefa'] includes string values of: no, yes where it is mixed with 20 different number of numeric values.

#We can replace 'no' with '0' df['edjefa']=df['edjefa'].replace('no', str(0)) #We can replace 'yes' with '1' df['edjefa']=df['edjefa'].replace('yes', str(1)) #Let's convert df['edjefe'] from Object to integer.

df['edjefa']=df['edjefa'].astype(int)

At block 1410, a display device may be controlled to render the determined second textual explanation. The processor 204 may be configured to control a display device (e.g., the display device 206A of the electronic device 102 of FIG. 2) to render the determined second textual explanation 418. The processor 204 may render the second textual explanation 418 on the display device 208A for the user 116. The second textual explanation 418 may be a natural language easy-to-understand text that may explain the revisions (e.g., datatype conversions) in the updated dataset 414. Control may pass to end.

Although the flowchart 1400 is illustrated as discrete operations, such as 1402, 1404, 1406, 1408, and 1410. However, in certain embodiments, such discrete operations may be further divided into additional operations, combined into fewer operations, or eliminated, depending on the particular implementation without detracting from the essence of the disclosed embodiments.

Figure 15:
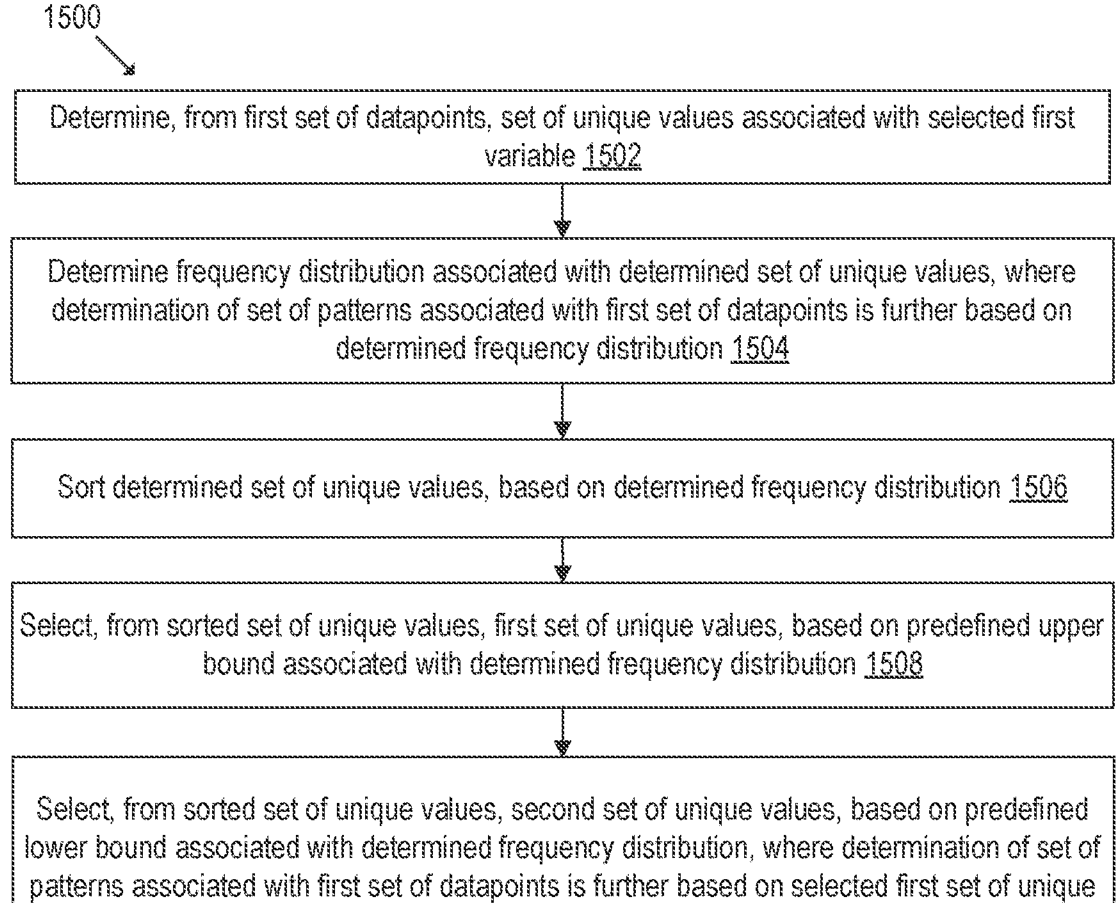
FIG. 15 is a diagram that illustrates a flowchart of an example method for outlier detection and generation of associated textual explanation.

FIG. 15 is a diagram that illustrates a flowchart of an example method for outlier detection and generation of associated textual explanation, in accordance with an embodiment of the disclosure. FIG. 15 is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14. With reference to FIG. 15, there is shown a flowchart 1500. The method illustrated in the flowchart 1500 may start at 1502 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1500 may be divided into additional blocks, combined into fewer blocks, or eliminated, depending on the particular implementation.

At block 1502, a set of unique values associated with the selected first variable may be determined, from the first set of datapoints. In an embodiment, the processor 204 may be configured to determine, from the first set of datapoints, a set of unique values associated with the selected first variable of the dataset 110A. For example, in case the selected first variable corresponds to a date field that includes months associated with dates, the set of unique values may include strings such as, "January", "February", "March", . . . "December".

At block 1504, a frequency distribution associated with the determined set of unique values may be determined, wherein the determination of the set of patterns associated with the first set of datapoints may be further based on the determined frequency distribution. In an embodiment, the processor 204 may be configured to determine a frequency distribution associated with the determined set of unique values. For example, the processor 204 may use a function such as, "value_counts( )" function of a "pandas" library of "Python" programming language to determine the frequency distribution or counts of the determined set of unique values.

In an embodiment, the determination of the set of patterns associated with the first set of datapoints may be further based on the determined frequency distribution. The processor 204 may determine statistics associated with the determined frequency distribution to determine a set of patterns. In an example, the set of patterns may include summary data corresponding to the determined statistics associated with the determined frequency. In another example, the processor 204 may determine a type of statistical distribution (e.g., a normal distribution with a certain mean and standard deviation) associated with the determined frequency distribution. For example, the processor 204 may be a statistical hypothesis testing technique to determine the type of statistical distribution associated with the determined frequency distribution. In an example, the processor 204 may use an inbuilt library (such as, a "pandas" library) of "Python" programming language to determine the statistical distribution. The processor 204 may be configured to determine a textual explanation based on such set of patterns. For example, the determined textual explanation may indicate that "The frequency distribution of the variable "V" follows a normal distribution with mean "u" and standard deviation "sd". The minimum and maximum values of the variable "V" are "m" and "n"".

At block 1506, the determined set of unique values may be sorted, based on the determined frequency distribution. In an embodiment, the processor 204 may be configured to sort the determined set of unique values, based on the determined frequency distribution. For example, the processor 204 may use an in-built function, such as, a "sorted( )" function, of "Python" programming language to sort the determined set of unique values associated with the determined frequency distribution.

At block 1508, a first set of unique values may be selected from the sorted set of unique values, based on a predefined upper bound associated with the determined frequency distribution. In an embodiment, the processor 204 may be configured to select, from the sorted set of unique values, a first set of unique values, based on a predefined upper bound associated with the determined frequency distribution. In an embodiment, the predefined upper bound may correspond to a certain percentile of high values. For example, the predefined upper bound may correspond to top "1" percentile values. The processor 204 may select the top "1" percentile unique values from the sorted set of unique values, based on the predefined upper bound, as the first set of unique values.

At block 1510, a second set of unique values may be selected from the sorted set of unique values, based on a predefined lower bound associated with the determined frequency distribution, wherein the determination of the set of patterns associated with the first set of datapoints may be further based on the selected first set of unique values and the selected second set of unique values, and wherein each of the predefined lower bound and the predefined upper bound may correspond to at least one of a predefined outlier percentile, an inter-quartile range (IQR), or a Z-score. In an embodiment, the processor 204 may be configured to select, from the sorted set of unique values, a second set of unique values, based on a predefined lower bound associated with the determined frequency distribution. In an embodiment, the predefined lower bound may correspond to a certain percentile of low values. For example, the predefined lower bound may correspond to bottom "1" percentile values. The processor 204 may select the bottom "1" percentile unique values from the sorted set of unique values, based on the predefined lower bound, as the second set of unique values.

In an embodiment, the determination of the set of patterns associated with the first set of datapoints may be further based on the selected first set of unique values and the selected second set of unique values. The processor 204 may determine outliers associated with the frequency distribution of the set of unique values of the selected first variable, based on values (i.e., the first set of datapoints) above the predefined upper bound and values (i.e., the second set of datapoints) below the predefined lower bound. The processor 204 may determine a set of patterns as a list of outlier values (including the first set of datapoints and the second set of datapoints) and statistics related to the list of outlier values. The outlier values may correspond to a set of interesting datapoints associated with the selected first variable. For example, the processor 204 may determine a textual explanation associated with the determined set of patterns that "The variable "V" has 10 outlier values including 5 top values: 100, 99, 98, 97, 96; and 5 bottom values: 1, 2, 3, 4, 5. The top values lie in the top 5 percentile and the bottom values lie in the bottom 5 percentile of all values of the variable "V" in the dataset "D"!".

In an embodiment, each of the predefined lower bound and the predefined upper bound may correspond to at least one of a predefined outlier percentile, an inter-quartile range (IQR), or a Z-score. For example, the predefined outlier percentile may correspond to a top or bottom 1 percentile values. The inter-quartile range (IQR) may correspond to a difference of a third quartile ($Q_3$) and a first quartile ($Q_1$), i.e., $Q_3-Q_1$. Further, the Z-score may correspond to a ratio of a difference of a value from a mean to a standard deviation of a distribution (which may correspond to a normal distribution with a predefined mean and standard deviation). Control may pass to end.

Although the flowchart 1500 is illustrated as discrete operations, such as 1502, 1504, 1506, 1508, and 1510. However, in certain embodiments, such discrete operations may be further divided into additional operations, combined into fewer operations, or eliminated, depending on the particular implementation without detracting from the essence of the disclosed embodiments.

Figure 16:
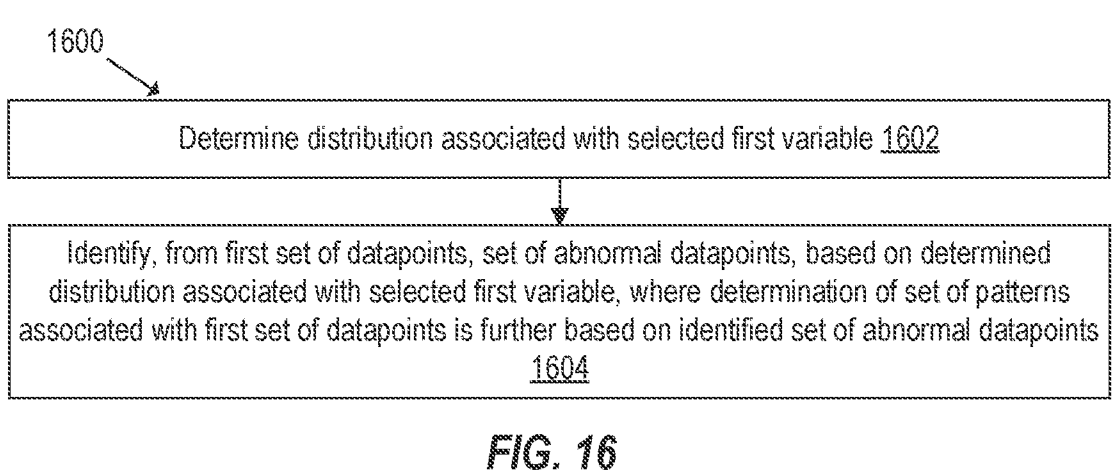
FIG. 16 is a diagram that illustrates a flowchart of an example method for determination of abnormal values in a distribution associated with a variable of dataset and generation of associated textual explanation.

FIG. 16 is a diagram that illustrates a flowchart of an example method for determination of abnormal values in a distribution associated with a variable of dataset and generation of associated textual explanation, in accordance with an embodiment of the disclosure. FIG. 16 is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15. With reference to FIG. 16, there is shown a flowchart 1600. The method illustrated in the flowchart 1600 may start at 1602 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1600 may be divided into additional blocks, combined into fewer blocks, or eliminated, depending on the particular implementation.

At block 1602, a distribution associated with the selected first variable may be determined. In an embodiment, the processor 204 may be configured to determine a distribution associated with the selected first variable associated with the dataset 110A. The processor 204 may determine a type of statistical distribution (e.g., a uniform distribution or a normal distribution with a certain mean and standard deviation) associated with the selected first variable based on a statistical hypothesis testing technique. In an example, the processor 204 may use an inbuilt library (such as, a "pandas" library) of "Python" programming language to determine the distribution.

At 1604, a set of abnormal datapoints may be identified from the first set of datapoints, based on the determined distribution associated with the selected first variable, wherein the determination of the set of patterns associated with the first set of datapoints may be further based on the identified set of abnormal datapoints. In an embodiment, the processor 204 may be configured to identify a set of abnormal datapoints from the first set of datapoints, based on the determined distribution associated with the selected first variable. In an embodiment, the set of abnormal datapoints may correspond to outliers associated with the selected first variable. In current case, the selected first variable may correspond to a categorical variable. For example, the processor 204 may determine a minimum value, a maximum value, top "N" values, bottom "N" values, and "M" least frequently occurring values, as the set of abnormal datapoints from the first set of datapoints.

In an embodiment, the determination of the set of patterns associated with the first set of datapoints may be further based on the identified set of abnormal datapoints. For example, the processor 204 may determine a set of patterns as a list of outlier values and statistics related to the list of outlier values. For example, the processor 204 may determine a textual explanation associated with the determined set of patterns such as, "The categorical variable "V" has the following abnormal datapoints: Minimum value—"m1", Maximum value—"m2", Top 3 values—"m2, m3, m4", Bottom 3 values—"m5, m6, m7", and Five least occurring values—m8, m9, m10, m11, m12". Control may pass to end.

In case two (or more than two) variables are considered together for analysis and determination of the set of patterns, such an analysis may be referred to a bivariate (or multivariate) analysis. For example, in case two target variables of a bivariate analysis are numerical variables, a numeric-numeric analysis may be performed, in a manner similar to the analysis of a single numeric variable associated with a univariate analysis. In case one of the target variables is a numeric variable and the other target variable is a categorical variable, a numeric-categorical bivariate analysis may be performed. In an embodiment, the processor 204 may perform the numeric-categorical bivariate analysis, by grouping data based on a mean, a median, or box plots. Associated with the variables. For example, in case the two variables are salary (a numeric variable) and response (a categorical variable with values such as, "Yes" or "No"), the processor 204 may perform the bivariate analysis using "Python" programming language based on the following two code statements. Exemplary outputs of the two code statements are also mentioned:

```
[In 1]: data.groupby('response') ['salary'].mean( )
[Out 1]: response
no 56789.250000
yes 56829.500000
Name: salary, dtype: float 64
[In 2]: data.groupby('response') ['salary'].median( )
[Out 2]: response
no 56810
yes 56810
Name: salary, dtype: float 64
```

As may be evident from the outputs, the mean salary of respondents associated with "no" response and respondents associated with "yes" response are very close to each other and the median salary of both such respondents is the same value. In such case, the processor 204 may determine a set of patterns indicating that the response of a person may not vary with or depend upon the salary of the person. The processor 204 may convert the datatype of the "response" variable from a Boolean to a numeric datatype (i.e., from "Yes" or "No" values to "1" and "0" values, respectively). Further, the processor 204 may determine statistics associated with the converted "response" variable. Example of the statistics may include a count of each unique value of the "response" variable.

In case of a scenario of multivariate analysis where there may be more than two variables for analysis, in an embodiment, the processor 204 may determine a pivot table associated with the variables and thereafter create a heatmap plot. For example, there may be three variables such as, "education" (a categorical variable), "marital_status" (a categorical variable), and "response_rate" (a numerical variable), associated with a dataset corresponding to a survey. In the current case, the processor 204 may perform the multivariate analysis using "Python" programming language based on the following two code statements:

```
[In 1] result=pd.pivot_table (data=data, index='education', columns='marital_status', values='response_rate')
[In 2] print(result)
```

For example, based on an output of the pivot table, the processor 204 may determine that married people with primary education may be less likely to respond positively to the survey and single people with tertiary education may be more likely to respond positively to the survey. In another embodiment, the processor 204 may determine a correlation between a pair of variables from the multiple variables associated with the multivariate analysis. For example, processor 204 may determine how the response rate (i.e., the variable "response_rate") varies for different categories in marital statuses (i.e., the variable "marital_status"). In the current case, the processor 204 may perform the multivariate analysis using "Python" programming language based on the following two code statements:

```
[In 1]: data.groupby('marital_status') ['response_rate']
    .mean( )plot.bar( )
[In 2]: plt.show( )
```

Based on the aforementioned code, the processor 204 may output a bar graph plot of "marital_status" with average value of "response_rate". In an example, processor 204 may determine single people may provide more positive responses than people of other marital statuses.

Although the flowchart 1600 is illustrated as discrete operations, such as 1602 and 1604. However, in certain embodiments, such discrete operations may be further divided into additional operations, combined into fewer operations, or eliminated, depending on the particular implementation without detracting from the essence of the disclosed embodiments.

Figure 17:
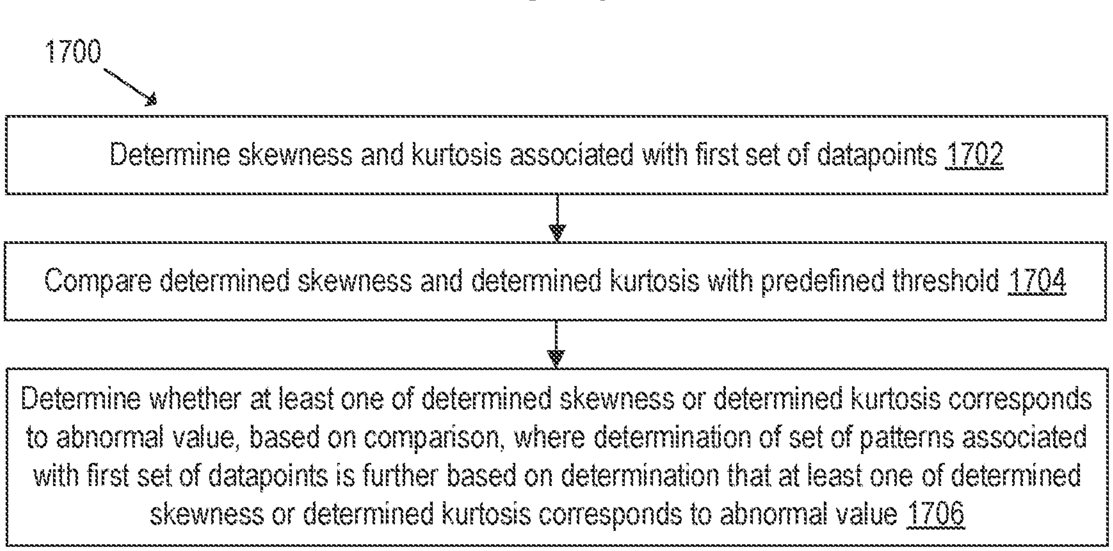
FIG. 17 is a diagram that illustrates a flowchart of an example method for determination of abnormal values associated with a variable of dataset and generation of associated textual explanation.

FIG. 17 is a diagram that illustrates a flowchart of an example method for determination of abnormal values associated with a variable of dataset and generation of associated textual explanation, in accordance with an embodiment of the disclosure. FIG. 17 is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, and FIG. 16. With reference to FIG. 17, there is shown a flowchart 1700. The method illustrated in the flowchart 1700 may start at 1702 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1700 may be divided into additional blocks, combined into fewer blocks, or eliminated, depending on the particular implementation.

At block 1702, a skewness and a kurtosis associated with the first set of datapoints may be determined. In an embodiment, the processor 204 may be configured to determine the skewness and kurtosis associated with the first set of datapoints associated with the dataset 110A. The processor 204 may determine the skewness associated with the first set of datapoints by use of expression (1) as described further, for example, in FIG. 11 (at block 1102). The processor 204 may determine the kurtosis associated with the first set of datapoints by use of expression (2) as described further, for example, in FIG. 12 (at block 1202).

At block 1704, the determined skewness and the determined kurtosis may be compared to a predefined condition. In an embodiment, the processor 204 may be configured to compare the determined skewness and the determined kurtosis to the predefined condition. In an example, the predefined condition may correspond to a set of predefined thresholds that may be manually assigned values. In another example, the processor 204 may determine the set of predefined thresholds based on an average value associated with a skewness and/or a kurtosis of a set of sample datasets. In an example, the determined skewness may be compared with a first predefined condition of '0' and the determined kurtosis may be compared with a second predefined condition of '3'.

At block 1706, it may be determined whether at least one of the determined skewness or the determined kurtosis corresponds to an abnormal value, based on the comparison, wherein the determination of the set of patterns associated with the first set of datapoints may be further based on the determination that the at least one of the determined skewness or the determined kurtosis corresponds to the abnormal value. In an embodiment, the processor 204 may be configured to determine whether at least one of the determined skewness or the determined kurtosis corresponds to an abnormal value, based on the comparison. For example, the processor 204 may determine that the determined skewness corresponds to an abnormal value in case the determined skewness does not equal the first predefined condition (i.e., "0"). When the skewness is not equal to '0', the first set of datapoints associated with the selected first variable may correspond to skewed or asymmetric distribution. In another example, the processor 204 may determine that the determined kurtosis corresponds to an abnormal value in case the determined kurtosis is greater than the second predefined condition (i.e., '3'). When the kurtosis is greater than '3', the first set of datapoints associated with the selected first variable may have a high outlier datapoint frequency as compared to the rest of the datapoints of the first variable. Thus, the processor 204 may determined whether at least one of the determined skewness or the determined kurtosis corresponds to the abnormal value.

In an embodiment, the determination of the set of patterns associated with the first set of datapoints may be further based on the determination that the at least one of the determined skewness or the determined kurtosis corresponds to the abnormal value. The processor 204 may be configured to determine a textual explanation based on such set of patterns. For example, in case the distribution of the first variable is determined as asymmetric based on an abnormal value of the skewness, the determined textual explanation may indicate that "The variable "V" is an asymmetric distribution about its mean "u", with a skewness value "x". The distribution is highly skewed!". In another example, in case the determined kurtosis is abnormal (i.e., greater than 3), the determined textual explanation may indicate that "The distribution of the variable "V" is a leptokurtic distribution, which is fat-tailed and has a high outlier datapoint frequency, with a kurtosis value "x". Control may pass to end.

Although the flowchart 1700 is illustrated as discrete operations, such as 1702, 1704, and 1706. However, in certain embodiments, such discrete operations may be further divided into additional operations, combined into fewer operations, or eliminated, depending on the particular implementation without detracting from the essence of the disclosed embodiments.

Figure 18:
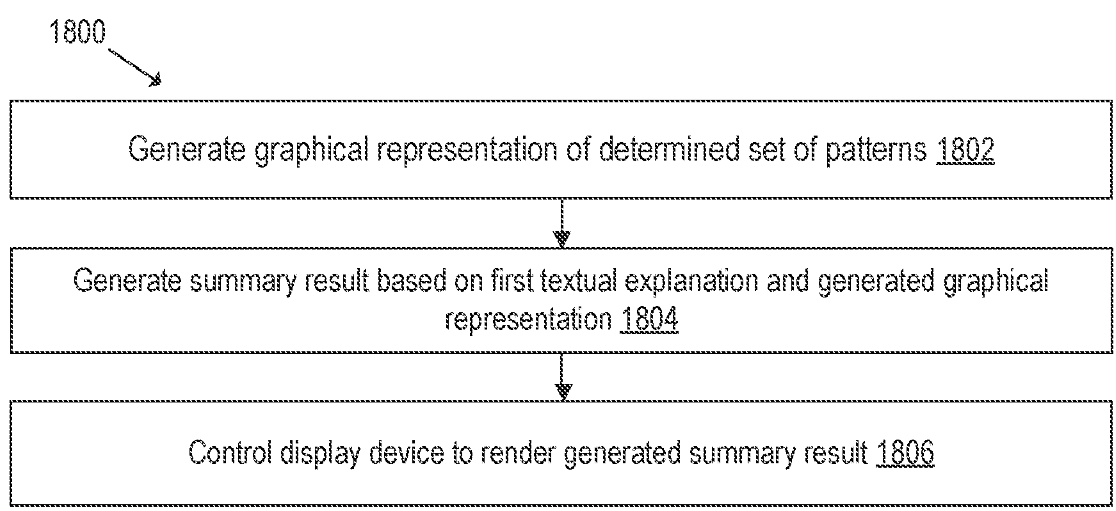
FIG. 18 is a diagram that illustrates a flowchart of an example method for generation of summary result including a textual explanation and a graphical representation of a set of patterns determined for a variable.

FIG. 18 is a diagram that illustrates a flowchart of an example method for generation of summary result including a textual explanation and a graphical representation of a set of patterns determined for a variable, in accordance with an embodiment of the disclosure. FIG. 18 is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17. With reference to FIG. 18, there is shown a flowchart 1800. The method illustrated in the flowchart 1800 may start at 1802 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1800 may be divided into additional blocks, combined into fewer blocks, or eliminated, depending on the particular implementation.

At block 1802, a graphical representation of the determined set of patterns may be generated. In an embodiment, the processor 204 may be configured to generate a graphical representation of the determined set of patterns. In an example, the processor 204 may use in-built visualization libraries of "Python" programming language to generate the graphical representation of the determined set of patterns. Examples of such visualization libraries may include, but is not limited to, "Matplotlib", "Plotly", "Seaborn", "GGplot", "Altair", "Bokeh", "Pygal", and "Geoplotlib".

At block 1804, a summary result may be generated based on the first textual explanation and the generated graphical representation. In an embodiment, the processor 204 may be configured to generate a summary result based on the first textual explanation (e.g., the first textual explanation 320) and the generated graphical representation. The determination of the first textual explanation is described further, for example, in FIGS. 3, 6, 8, 9, 10, 11, 12, 15, 16, and 17. Example of the generated summary result is described further, for example, in FIG. 19B.

At block 1806, a display device may be controlled to render the generated summary result. The processor 204 may be configured to control a display device (e.g., the display device 206A of the electronic device 102 of FIG. 2) to render the generated summary result including the first textual explanation (e.g., the first textual explanation 320) and the generated graphical representation. The processor 204 may render the summary result on the display device 208A for the user 116. The first textual explanation 320 may be a natural language easy-to-understand text that may explain the set of patterns 316 that may be determined from the first set of datapoints related to the first variable associated with the dataset 110A. The graphical represented may be generated from the determined set of patterns 316 and may correspond to a visualization of the determined set of patterns 316 to help the user 116 derive meaningful insights from the dataset 110A. Control may pass to end.

Although the flowchart 1800 is illustrated as discrete operations, such as 1802, 1804, and 1806. However, in certain embodiments, such discrete operations may be further divided into additional operations, combined into fewer operations, or eliminated, depending on the particular implementation without detracting from the essence of the disclosed embodiments.

FIG. 19A is a diagram that illustrates an exemplary scenario for display of a textual explanation associated a set of patterns determined for a variable, in accordance with an embodiment of the disclosure. FIG. 19A is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18. With reference to FIG. 19A, there is shown an exemplary scenario 1900A. The exemplary scenario 1900A may include a textual explanation 1902 and a set of patterns 1904.

For example, the processor 204 may be configured to determine the textual explanation 1902 and the set of patterns 1904 from the dataset 110A. The textual explanation 1902 may describe characteristics of the dataset 110A, for example, a number of rows and columns in the dataset 110A, and types of datatypes of the columns of the dataset 110A, and the like. Further, the set of patterns 1904 may correspond to a set of interesting datapoints that may be identified by the processor 204 from the dataset 110A. For example, outlier values that may correspond to an upper bound of the various fields of the dataset 110A may be determined as the set of interesting datapoints.

FIG. 19B is a diagram that illustrates an exemplary scenario for display of summary results including a graphical representation and a textual explanation, associated with a set of patterns determined from a dataset, in accordance with an embodiment of the disclosure. FIG. 19B is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, and FIG. 19A. With reference to FIG. 19B, there is shown an exemplary scenario 1900B. The exemplary scenario 1900B may include a textual explanation 1906, a graphical representation 1908, a graphical representation 1910, a textual explanation 1912, and a set of patterns 1914.

For example, the textual explanations 1906 and 1912 may include a natural language explanation of a statistical technique, such as, skewness, which may be used to determine the set of patterns 1914 from the dataset 110A. The processor 204 may be configured to retrieve the textual explanations 1906 and 1912 from the memory 206 or the database 104 and display the retrieved textual explanations 1906 and 1912. The graphical representations 1908 and 1910 may correspond to exemplary plots of a negatively skewed dataset and a positively skewed dataset. The set of patterns 1914 may include a skewness value determined for a set of columns in the dataset 110A. The set of patterns 1914 may correspond to a textual explanation of the skewness value, such as, "moderately skewed" or "highly skewed". The determination of the skewness value is described further, for example, in FIG. 11.

It should be noted that the scenarios 1900A and 1900B of FIGS. 19A and 19B, respectively, are for exemplary purposes and should not be construed to limit the scope of the disclosure.

FIG. 20A is a diagram that illustrates an exemplary scenario for determination of a set of patterns from a dataset and display of a textual explanation of the determined set of patterns, in accordance with an embodiment of the disclosure. FIG. 20A is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19A, and FIG. 19B. With reference to FIG. 20A, there is shown an exemplary scenario 2000A. The exemplary scenario 2000A may include a set of predefined rules 2002, a textual explanation 2004, a set of patterns 2006, and a textual explanation 2008.

For example, the set of predefined rules 2002 may correspond to rules and conditions associated with the identification of outlier values in the dataset 110A. In an example, the set of predefined rules 2002 may include a first condition associated with a determination of a top or bottom "1" percentile values, a second condition associated with a determination of an inter-quartile range, and/or a third condition associated with a determination of a Z-score. Based on the identified outlier values, the processor 204 may determine the set of patterns 2006 and the textual explanations 2004 and 2008. The identification of the outlier values is described further, for example, in FIG. 15.

The textual explanation 2004 may include a natural language text that may indicate how a set of interesting values (e.g., outlier values) may be determined by the processor 204. The set of patterns 2006 may include the set of interesting values and a criterion for selection of a value of as an interesting value. The textual explanation 2008 may include a natural language text that may indicate statistics related to the set of interesting values. For example, the column "Age" has a value "24" which occurs "30" times in the dataset 110A. In the current case, as shown in FIG. 20A, the frequency of occurrence of the column may be greater than an upper bound criteria associated with the column.

Figure 20B:
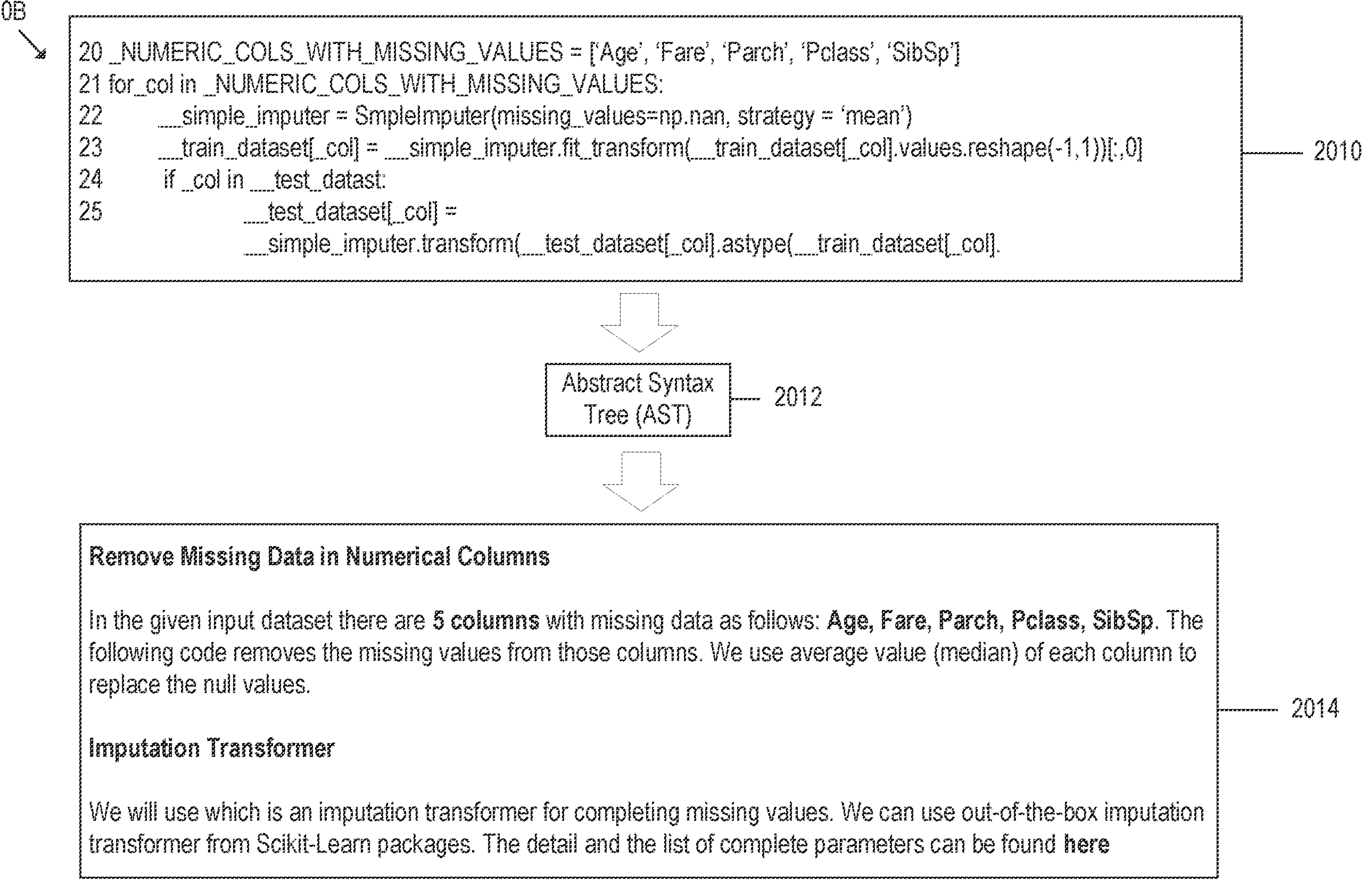
FIG. 20B is a diagram that illustrates an exemplary scenario for determination of a textual explanation of a machine-generated code.

FIG. 20B is a diagram that illustrates an exemplary scenario for determination of a textual explanation of a machine-generated code, in accordance with an embodiment of the disclosure. FIG. 20B is described in conjunction with elements from FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19A, FIG. 19B, and FIG. 20A. With reference to FIG. 20B, there is shown an exemplary scenario 2000B. The exemplary scenario 2000B may include a machine-generated code 2010, an abstract syntax tree 2012 (associated with the machine-generated code 2010), and a textual explanation 2014.

For example, the processor 204 may receive the machine-generated code 2010. In an example, the machine-generated code 2010 may correspond to a set of program code statements in "Python" programming language to impute "Null" values of a set of variables (e.g., "Age", "Fare", "Parch", "Pclass", and "SipSp") in the dataset 110A with a mean value of corresponding variables of the set of variables. The processor 204 may be configured to generate the abstract syntax tree 2012 associated with the machine-generated code 2010. Based on an analysis of the generated abstract syntax tree 2012, the processor 204 may generate the textual explanation 2014. The textual explanation 2014 may include a natural language text that may indicate that missing values of 5 columns may be imputed based on median values of the corresponding columns and that an "Imputation Transformer" may be used for the imputation.

It should be noted that the scenarios 2000A and 2000B of FIGS. 20A and 20B, respectively, are for exemplary purposes and should not be construed to limit the scope of the disclosure.

Various embodiments of the disclosure may provide one or more non-transitory computer-readable storage media configured to store instructions that, in response to being executed, cause a system (such as, the example electronic device 102) to perform operations. The operations may include receiving a dataset including datapoints related to a set of variables. The operations may further include selecting a statistical analysis tool from a set of statistical analysis tools to analyze the received dataset. The operations may further include selecting a first variable of the set of variables. The operations may further include applying the selected statistical analysis tool on a first set of datapoints related to the selected first variable. The operations may further include determining statistical information related to the selected first variable, based on the application of the selected statistical analysis tool on the first set of datapoints. The operations may further include determining a set of patterns associated with the first set of datapoints, based on the determined statistical information related to the selected first variable. The operations may further include retrieving a first set of predefined templates associated with the determined set of patterns. The operations may further include applying a natural language model on the retrieved first set of predefined templates and on the determined statistical information. The operations may further include determining a first textual explanation of the determined set of patterns, based on the application of the natural language model on the retrieved first set of predefined templates and on the determined statistical information. The operations may further include controlling a display device to render the determined first textual explanation.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:

receiving a dataset including datapoints related to a set of variables;

selecting a statistical analysis tool from a set of statistical analysis tools to automatically analyze the received dataset;

selecting a first variable of the set of variables;

applying the selected statistical analysis tool on a first set of datapoints related to the selected first variable;

determining statistical information related to the selected first variable, based on the application of the selected statistical analysis tool on the first set of datapoints;

automatically determining a set of patterns associated with the first set of datapoints, based on the determined statistical information related to the selected first variable;

retrieving a first set of predefined templates associated with the determined set of patterns;

applying a natural language model on the retrieved first set of predefined templates and on the determined statistical information;

automatically determining a first textual explanation of the determined set of patterns, based on the application of the natural language model on the retrieved first set of predefined templates and on the determined statistical information; and controlling a display device to render the determined first textual explanation.

2. The method according to claim 1, wherein the set of statistical analysis tools corresponds to a set of tools to determine or explain at least one of an ordinal value, a skewness, a kurtosis, a data consistency, an interesting value, an outlier value, a categorical unordered univariate analysis, a univariate analysis, a bivariate analysis, a multivariate analysis, or a target value.

3. The method according to claim 1, further comprising:

determining whether the first set of datapoints satisfy a predefined condition, based on the determined statistical information, wherein the determination of the set of patterns associated with the first set of datapoints is further based on the determination that the first set of datapoints satisfy the predefined threshold.

4. The method according to claim 1, further comprising:

determining whether the first set of datapoints satisfy a predefined condition associated with a first datatype associated with the selected first variable;

automatically updating a second datatype of one or more of the first set of datapoints to the first datatype, based on the determination that the first set of datapoints satisfies the predefined condition; and obtaining an updated dataset based on the update of the second datatype of the one or more of the first set of datapoints to the first datatype.

5. The method according to claim 4, further comprising:

retrieving a second set of predefined templates associated with the predefined condition;

applying the natural language model on the retrieved second set of predefined templates and the second datatype of the one or more of the first set of datapoints;

automatically determining a second textual explanation of the obtained updated dataset, based on the application of the natural language model on the retrieved second set of predefined templates and on the second datatype of the one or more of the first set of datapoints; and controlling the display device to render the determined second textual explanation.

6. The method according to claim 5, further comprising:

receiving a machine-generated code associated with a machine-learning (ML) pipeline;

applying the received machine-generated code on the obtained updated dataset; and generating an ML model based on the application of the received machine-generated code on the obtained updated dataset.

7. The method according to claim 1, further comprising:

determining, from the first set of datapoints, a set of unique values associated with the selected first variable;

determining whether the determined set of unique values corresponds to ordinal values, wherein the determination of the set of patterns associated with the first set of datapoints is further based on the determination that the determined set of unique values corresponds to the ordinal values; and normalizing the ordinal values to update the received dataset, based on the determination that the determined set of unique values corresponds to the ordinal values.

8. The method according to claim 1, further comprising:

determining whether the first set of datapoints related to the selected first variable corresponds to a set of predefined categories;

encoding the first set of datapoints based on the determination that the first set of datapoints corresponds to the set of predefined categories;

determining a value associated with each of the set of predefined categories, based on the encoded the first set of datapoints;

determining an average of the determined value associated with each of the set of predefined categories; and identifying an outlier category from the set of predefined categories, based on the determined average, wherein the determination of the set of patterns associated with the first set of datapoints is further based on the identification of the outlier category.

9. The method according to claim 1, further comprising:

applying a transformation function on the first set of datapoints; and transforming the first set of datapoints to obtain an updated dataset, based on the application of the transformation function on the first set of datapoints, wherein the determination of the set of patterns associated with the first set of datapoints is further based on the transformation of the first set of datapoints.

10. The method according to claim 1, further comprising:

determining a skewness associated with the first set of datapoints; and comparing the determined skewness with a set of predefined thresholds, wherein the determination of the set of patterns associated with the first set of datapoints is further based on the comparison of the determined skewness with the set of predefined thresholds.

11. The method according to claim 1, further comprising:

determining a kurtosis associated with the first set of datapoints; and determining whether the determined kurtosis corresponds to an abnormal value, wherein the determination of the set of patterns associated with the first set of datapoints is further based on the determined kurtosis and on the determination that the determined kurtosis corresponds to the abnormal value.

12. The method according to claim 1, further comprising:

determining whether a datatype of the selected first variable corresponds to an object type, wherein the datatype of the selected first variable corresponds to one of a string datatype, an integer datatype, a floating-point datatype, a mixed datatype of a string and an integer, a mixed datatype of a string and a floating-point, or a mixed datatype of an integer and a floating-point;

determining whether the datatype corresponds to a string datatype or a numeric datatype, based on the determination that the datatype corresponds to the object type;

determining whether the datatype corresponds to a Boolean string datatype, based on the determination that the datatype corresponds to the string datatype;

mapping the first set of datapoints from the Boolean string datatype to the numeric datatype;

determining whether the datatype corresponds to a floating-point numeric datatype or an integer numeric datatype, based on the determination that the datatype corresponds to the numeric datatype or based on the mapping;

converting the datatype to the floating-point numeric datatype to obtain an updated dataset, based on the determination that the datatype corresponds to the floating-point numeric datatype or the integer numeric datatype; and converting the datatype to the integer numeric datatype to obtain the updated dataset, based on the determination that the datatype does not corresponds to the floating-point numeric datatype or the integer numeric datatype, wherein the determination of the set of patterns associated with the first set of datapoints is further based on the obtained updated dataset.

13. The method according to claim 12, further comprising:

retrieving a second set of predefined templates associated with the object type corresponding to the selected first variable;

receiving a level of explanation associated with the object type corresponding to the selected first variable;

applying the natural language model on the retrieved second set of predefined templates, on the converted datatype associated with the selected first variable, and on the received level of explanation;

automatically determining a second textual explanation of the obtained updated dataset, based on the application of the natural language model on the retrieved second set of predefined templates, on the converted datatype, and on the received level of explanation; and controlling the display device to render the determined second textual explanation.

14. The method according to claim 1, further comprising:

determining, from the first set of datapoints, a set of unique values associated with the selected first variable; and determining a frequency distribution associated with the determined set of unique values, wherein the determination of the set of patterns associated with the first set of datapoints is further based on the determined frequency distribution.

15. The method according to claim 14, further comprising:

sorting the determined set of unique values, based on the determined frequency distribution;

selecting, from the sorted set of unique values, a first set of unique values, based on a predefined upper bound associated with the determined frequency distribution; and selecting, from the sorted set of unique values, a second set of unique values, based on a predefined lower bound associated with the determined frequency distribution, wherein the determination of the set of patterns associated with the first set of datapoints is further based on the selected first set of unique values and the selected second set of unique values, and each of the predefined lower bound and the predefined upper bound corresponds to at least one of a predefined outlier percentile, an inter-quartile range (IQR), or a Z-score.

16. The method according to claim 1, further comprising:

determining a distribution associated with the selected first variable; and identifying, from the first set of datapoints, a set of abnormal datapoints, based on the determined distribution associated with the selected first variable, wherein the determination of the set of patterns associated with the first set of datapoints is further based on the identified set of abnormal datapoints.

17. The method according to claim 1, further comprising:

determining a skewness and a kurtosis associated with the first set of datapoints;

comparing the determined skewness and the determined kurtosis with a predefined threshold; and determining whether at least one of the determined skewness or the determined kurtosis corresponds to an abnormal value, based on the comparison, wherein the determination of the set of patterns associated with the first set of datapoints is further based on the determination that the at least one of the determined skewness or the determined kurtosis corresponds to the abnormal value.

18. The method according to claim 1, further comprising:

generating a graphical representation of the determined set of patterns;

generating a summary result based on the first textual explanation and the generated graphical representation; and controlling the display device to render the generated summary result.

19. One or more non-transitory computer-readable storage media configured to store instructions that, in response to being executed, cause an electronic device to perform operations, the operations comprising:

receiving a dataset including datapoints related to a set of variables;

selecting a statistical analysis tool from a set of statistical analysis tools to automatically analyze the received dataset;

selecting a first variable of the set of variables;

applying the selected statistical analysis tool on a first set of datapoints related to the selected first variable;

determining statistical information related to the selected first variable, based on the application of the selected statistical analysis tool on the first set of datapoints;

automatically determining a set of patterns associated with the first set of datapoints, based on the determined statistical information related to the selected first variable;

retrieving a first set of predefined templates associated with the determined set of patterns;

applying a natural language model on the retrieved first set of predefined templates and on the determined statistical information;

automatically determining a first textual explanation of the determined set of patterns, based on the application of the natural language model on the retrieved first set of predefined templates and on the determined statistical information; and controlling a display device to render the determined first textual explanation.

20. An electronic device, comprising:

a memory storing instructions; and a processor, coupled to the memory, that executes the stored instructions to perform a process comprising:

receiving a dataset including datapoints related to a set of variables;

selecting a statistical analysis tool from a set of statistical analysis tools to automatically analyze the received dataset;

selecting a first variable of the set of variables;

applying the selected statistical analysis tool on a first set of datapoints related to the selected first variable;

determining statistical information related to the selected first variable, based on the application of the selected statistical analysis tool on the first set of datapoints;

automatically determining a set of patterns associated with the first set of datapoints, based on the determined statistical information related to the selected first variable;

retrieving a first set of predefined templates associated with the determined set of patterns;

applying a natural language model on the retrieved first set of predefined templates and on the determined statistical information;

automatically determining a first textual explanation of the determined set of patterns, based on the application of the natural language model on the retrieved first set of predefined templates and on the determined statistical information; and controlling a display device to render the determined first textual explanation.

* * * * *